US009491596B2

(12) United States Patent
Hammer et al.

(10) Patent No.: US 9,491,596 B2
(45) Date of Patent: Nov. 8, 2016

(54) PRIORITIZED PUSH-TO-TALK SESSION USING QUALITY OF SERVICE (QOS) OVER AN INTERNET PROTOCOL MULTIMEDIA SUBSYSTEM (IMS)

(71) Applicants: Cellco Partnership, Basking Ridge, NJ (US); Verizon Patent and Licensing Inc., Basking Ridge, NJ (US)

(72) Inventors: Howard G. Hammer, Wayne, NJ (US); Shweta Sinha, Tampa, FL (US); Muhammad Salman Nomani, Somerset, NJ (US); Mauricio Pati Caldeira de Andrada, South Plainfield, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 216 days.

(21) Appl. No.: 14/058,008

(22) Filed: Oct. 18, 2013

(65) Prior Publication Data
US 2015/0110005 A1   Apr. 23, 2015

(51) Int. Cl.
*H04W 4/00* (2009.01)
*H04W 4/10* (2009.01)

(52) U.S. Cl.
CPC .................................... *H04W 4/10* (2013.01)

(58) Field of Classification Search
USPC ........................................................ 370/329
See application file for complete search history.

(56) References Cited

U.S. PATENT DOCUMENTS

| 8,447,341 B2 | 5/2013 | Denman et al. |
| 2007/0094409 A1* | 4/2007 | Crockett ................. H04L 29/06 709/233 |
| 2011/0122783 A1* | 5/2011 | Lin et al. ...................... 370/252 |
| 2014/0221023 A1* | 8/2014 | Maggenti et al. ............ 455/458 |

OTHER PUBLICATIONS

Andorid Developers, "Google Play Services", developer.android.com/google/play-services/index.html, Dec. 3, 2012, 2 pages.

* cited by examiner

*Primary Examiner* — Yemane Mesfin
*Assistant Examiner* — Mon Cheri Davenport

(57) ABSTRACT

A device establishes a quality of service (QoS) framework with a network connected to the device. The device includes a push-to-talk (PTT) application, and the QoS framework assigns priorities to different types of traffic associated with the device. The device utilizes the PTT application to establish a PTT session with another device via the network, and prioritizes, based on the QoS framework, PTT traffic, provided in the PTT session, over best effort traffic during the PTT session with the other device.

20 Claims, 21 Drawing Sheets

| Application Type | QCI | Bearer Characteristics |
|---|---|---|
| VoIP / Audio part of video telephony | 1 | GBR, conversational fixed bit rate audio |
| IMS signaling / SIP / other signaling | 5 | Non-GBR, low data rate, highest priority |
| Enhanced video telephony | 6 | Non-GBR, variable bit rate video |
| Public safety data apps / enterprise traffic | 7 | Non-GBR, higher priority than all Internet traffic |
| Best effort Internet traffic / standard video telephony | 8 | Non-GBR, best effort, standard video telephony |
| Slightly less than best effort traffic / M2M traffic | 8 | Non-GBR, lowest priority |

PTT traffic is here without QoS

540

| Application Type | QCI | Bearer Characteristics |
|---|---|---|
| VoIP / Audio part of video telephony | 1 | GBR, conversational fixed bit rate audio |
| PTT IMS signaling / SIP / other signaling | 5 | Non-GBR, low data rate, highest priority |
| Enhanced video telephony | 6 | Non-GBR, variable bit rate video |
| Public safety data apps / enterprise traffic / PTT | 7 | Non-GBR, higher priority than all Internet traffic |
| Best effort Internet traffic / standard video telephony | 8 | Non-GBR, best effort, standard video telephony |
| Slightly less than best effort traffic / M2M traffic | 8 | Non-GBR, lowest priority |

PTT traffic is here with QoS

500

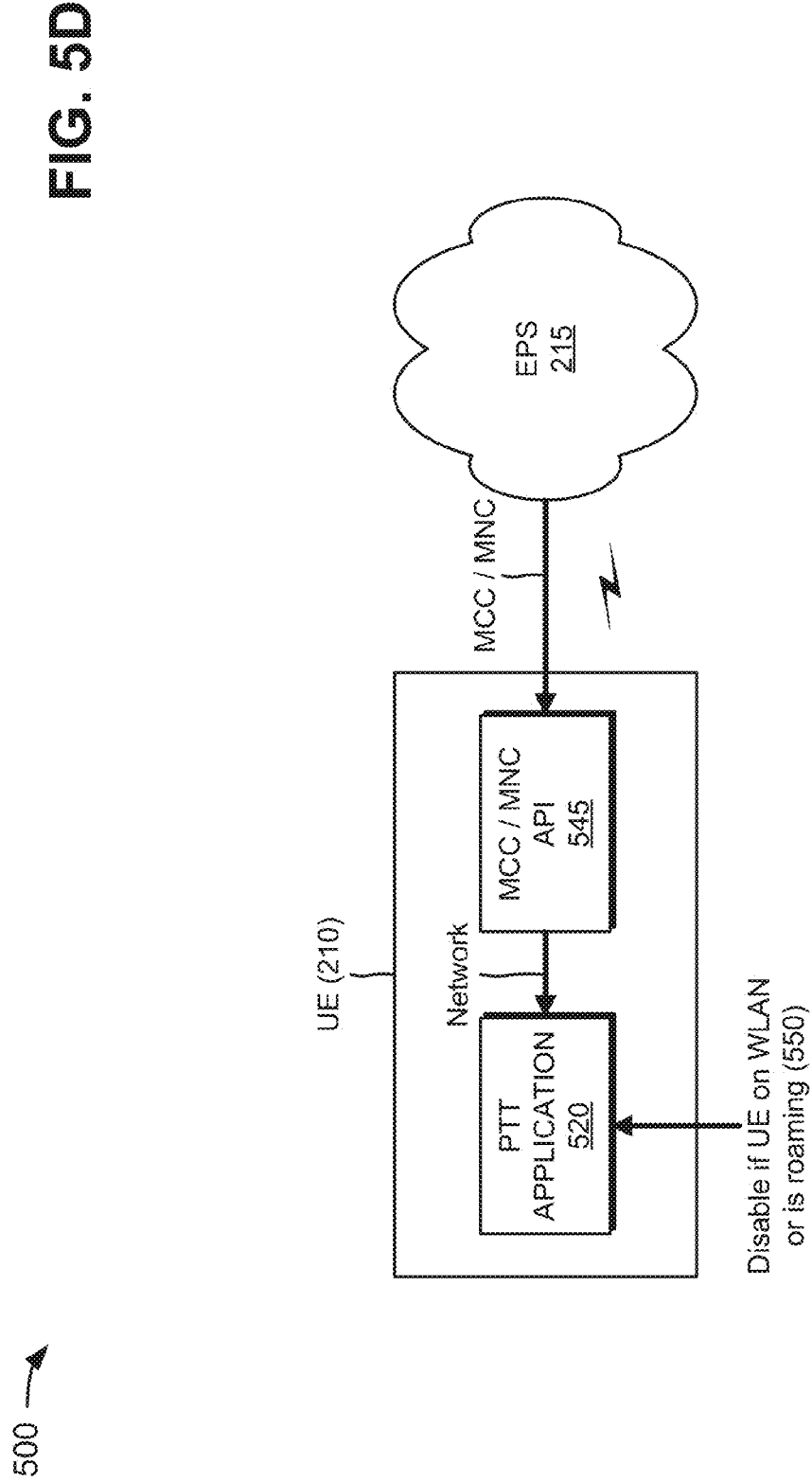

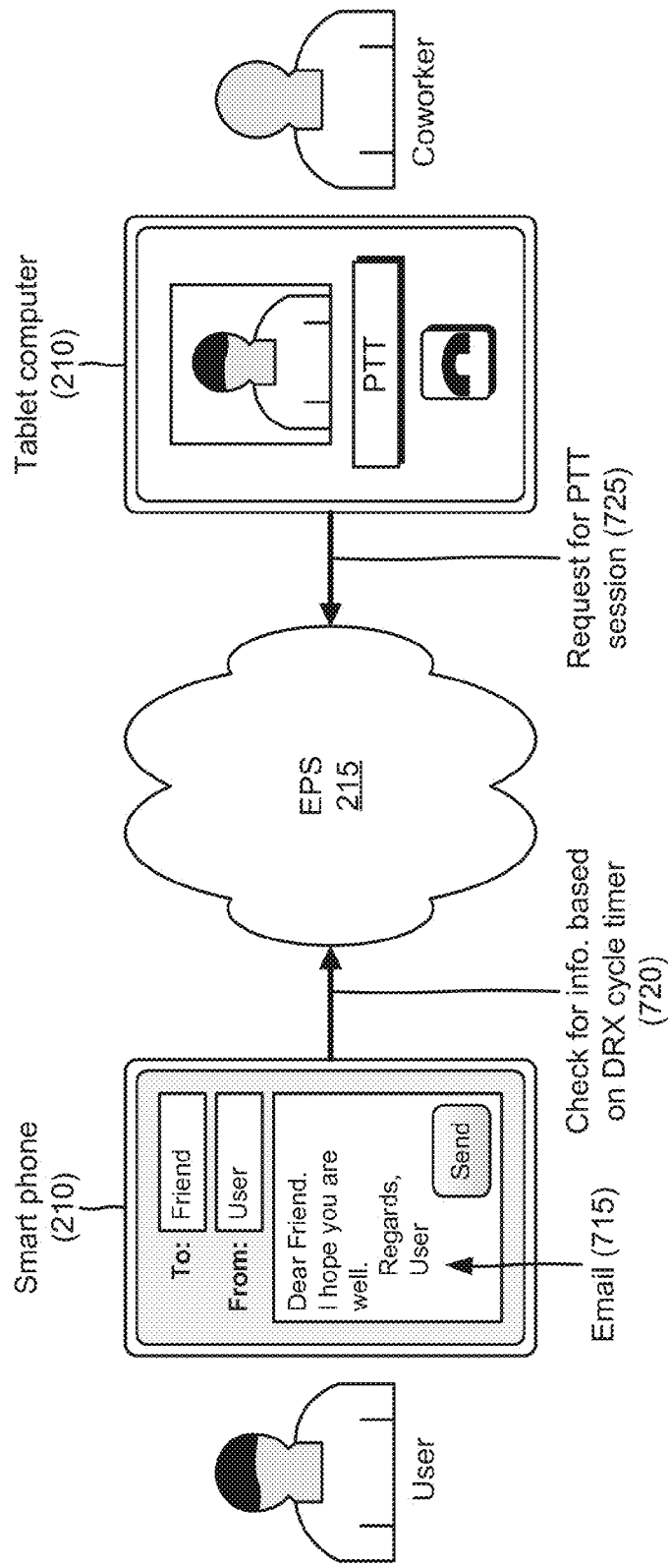

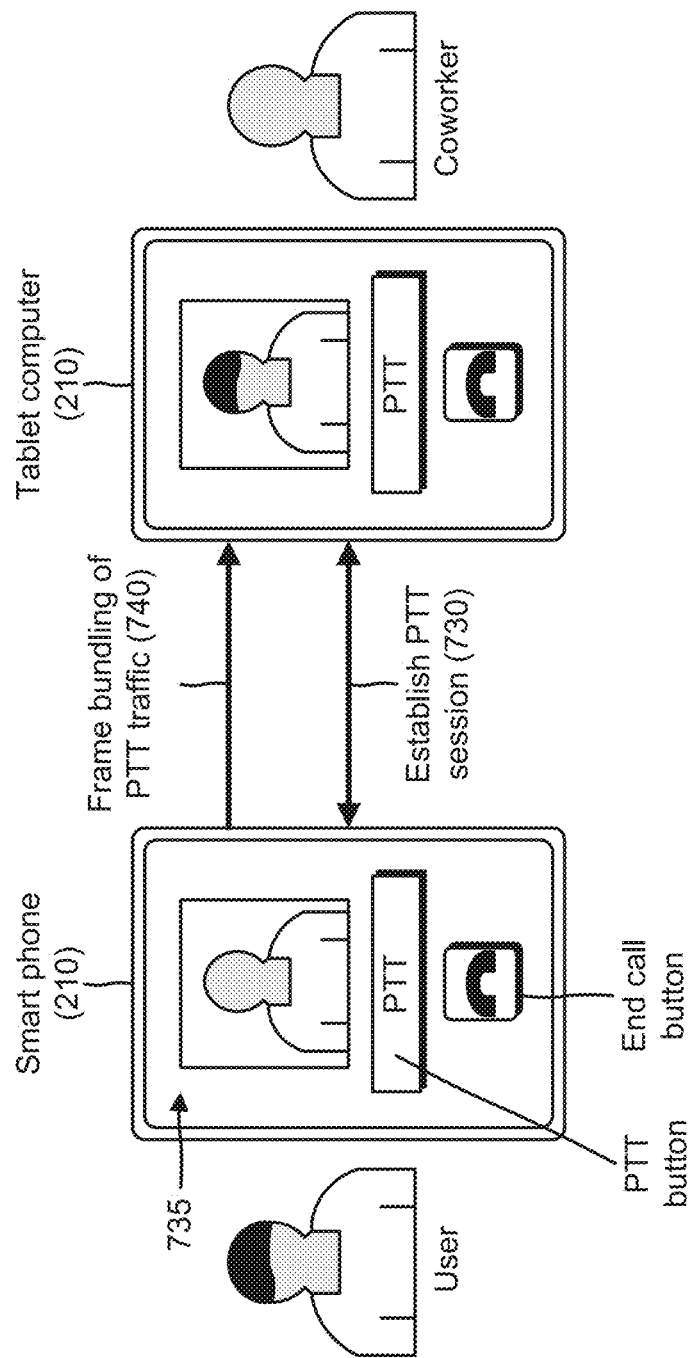

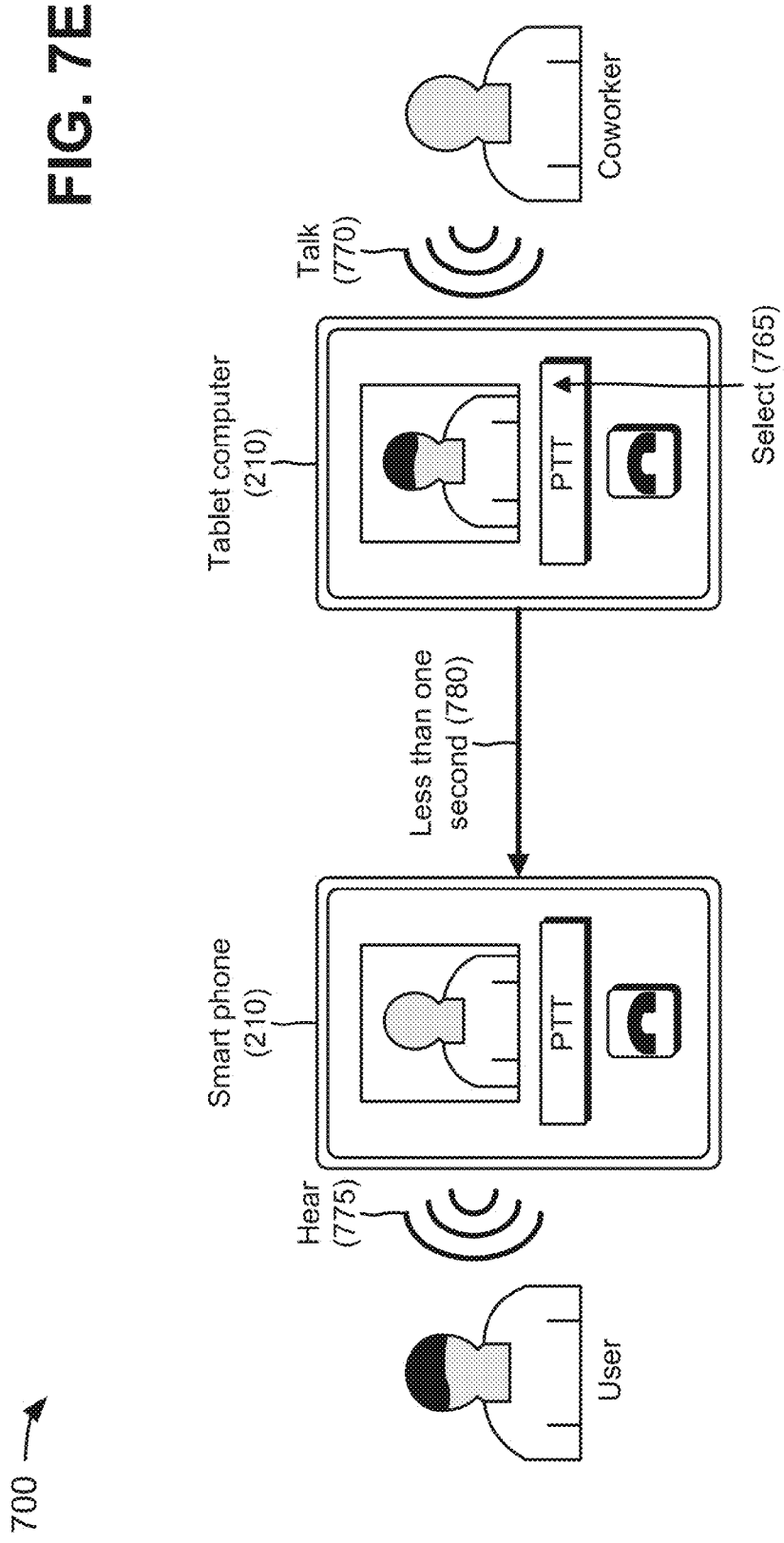

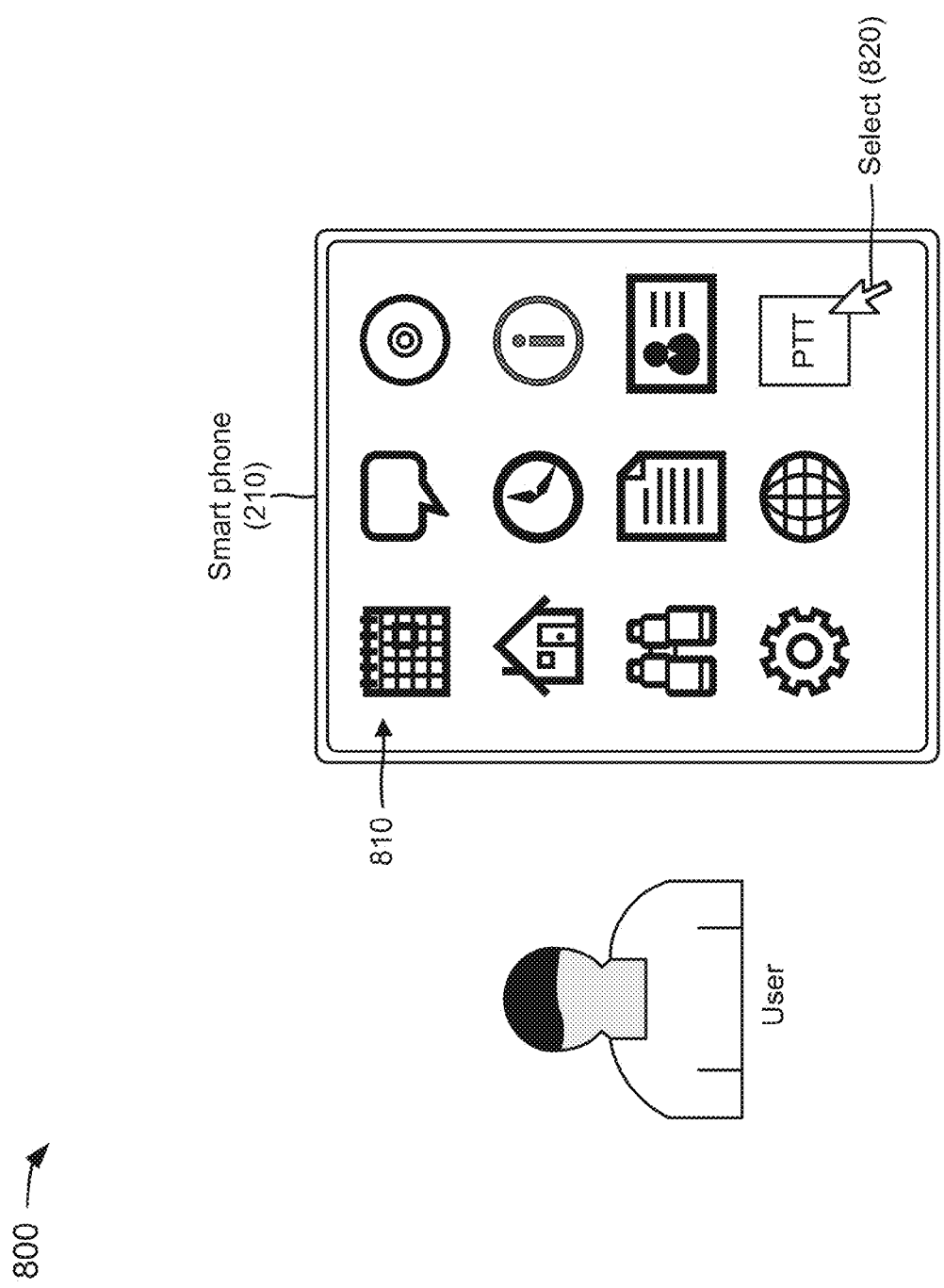

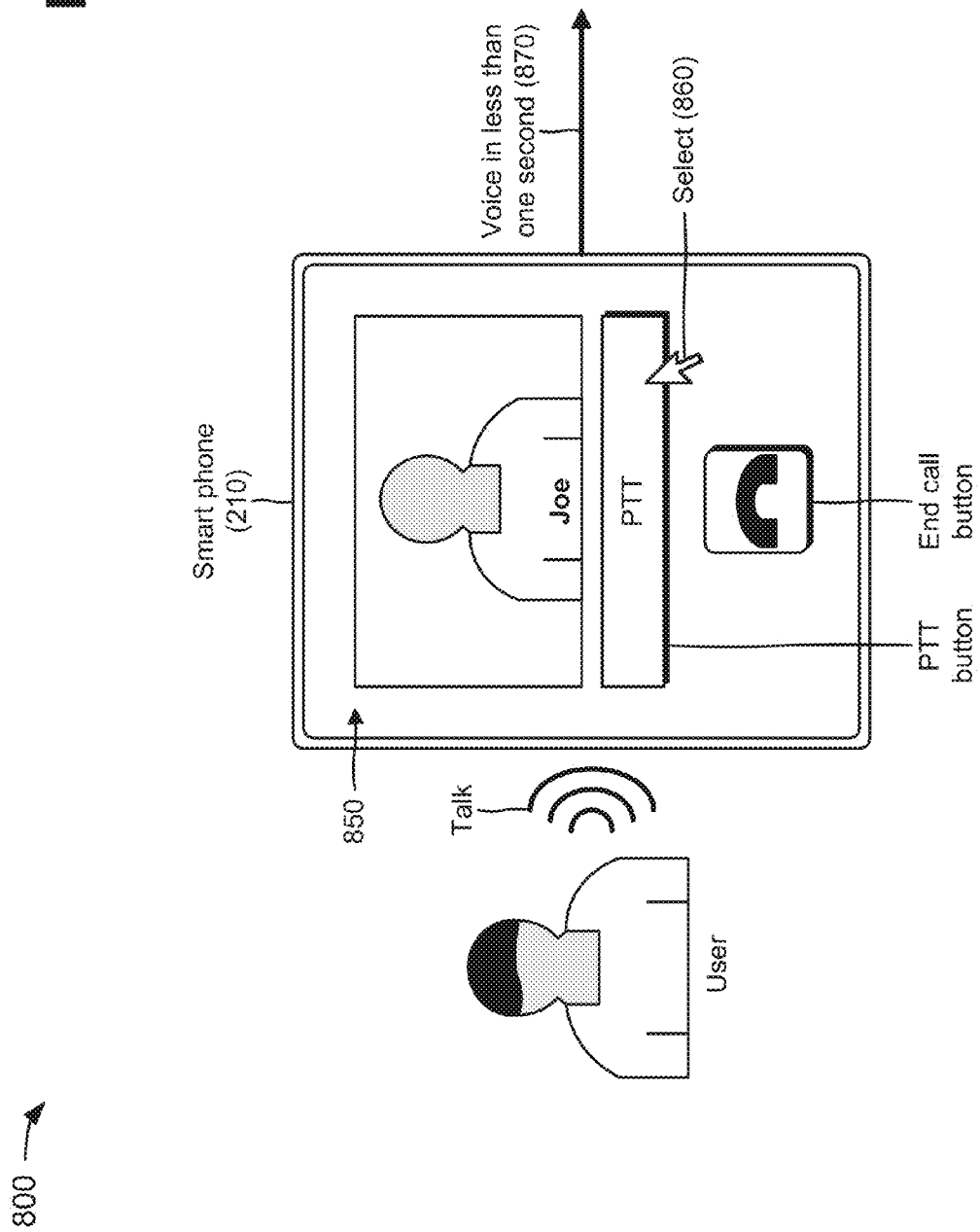

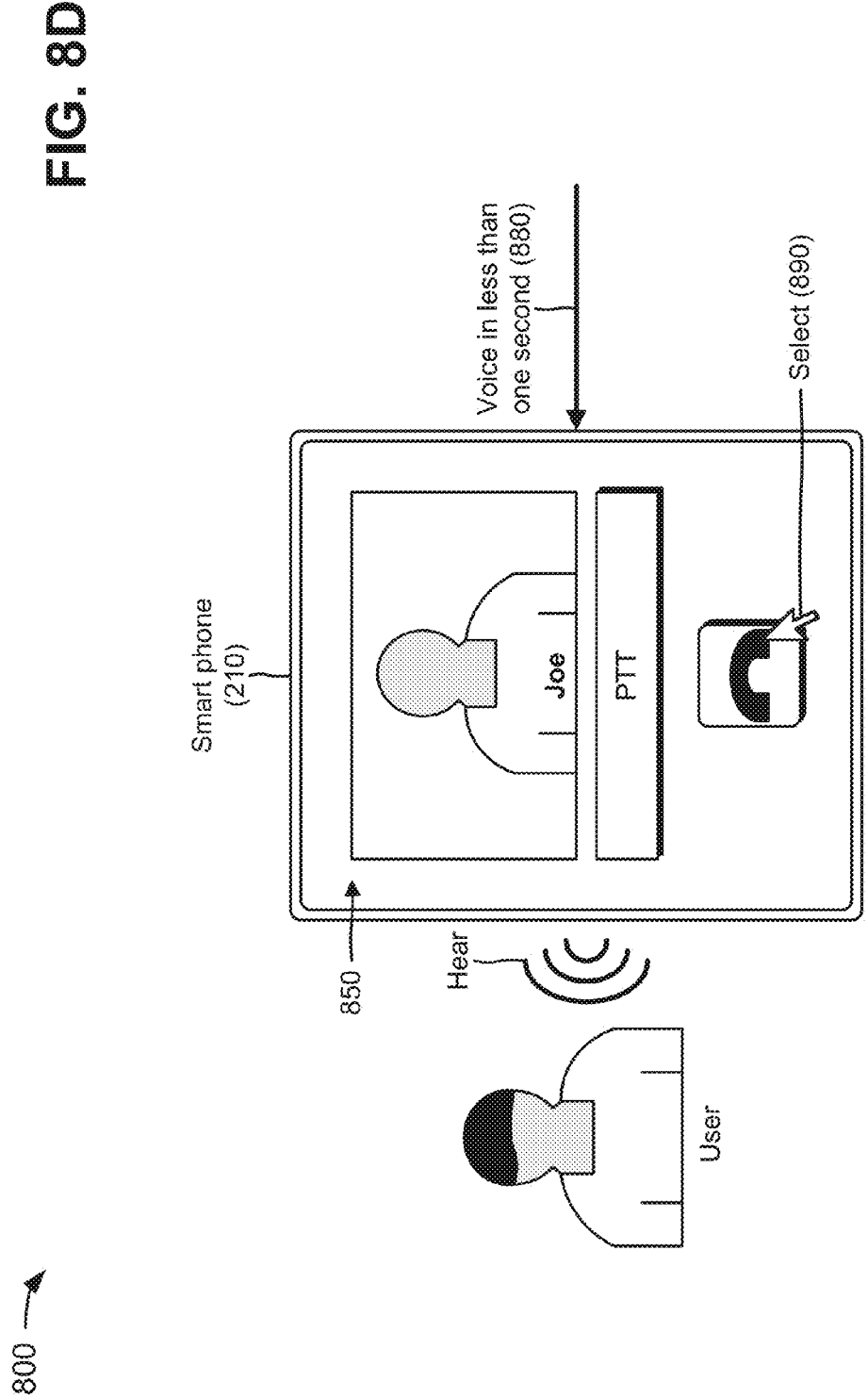

PRIORITIZED PUSH-TO-TALK SESSION USING QUALITY OF SERVICE (QOS) OVER AN INTERNET PROTOCOL MULTIMEDIA SUBSYSTEM (IMS)

BACKGROUND

A push-to-talk (PTT) service provides direct one-to-one and/or one-to-many audio communication. PTT may include a mechanism that provides instantaneous communication between parties, and that utilizes a button to switch user equipment (UE) from a voice transmission mode to a voice reception mode. The operation of UEs in this manner may be similar to how walkie talkies operate. A PTT service may switch a UE from a full duplex mode, where both parties may hear each other simultaneously, to a half duplex mode, where a single party may speak at one time. Multiple parties to a conversation may also be included. Availabilities of parties may be checked before a call with the help of a presence function.

In the Third Generation Partnership Project (3GPP), the fourth generation (4G) cellular network includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network is often called an evolved universal terrestrial radio access network (E-UTRAN). The EPC network is an all-IP packet-switched core network that supports high-speed wireless and wireline broadband access technologies. The EPC network allows UEs to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching.

BRIEF DESCRIPTION OF THE DRAWINGS

FIGS. 5A-5E are diagrams of an example relating to the example process shown in FIG. 4;

FIGS. 7A-7F are diagrams of an example relating to the example process shown in FIG. 6; and FIGS. 8A-8E are diagrams of another example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Current 4G PTT applications use a public Internet connection with no quality of service (QoS) for PTT services. Without QoS, a user's PTT experience may degrade when a network or a UE is busy and PTT traffic is queued up behind other traffic (e.g., email, video, Internet, etc. traffic). The user experience may be exemplified in what is called a "push to hear" delay, which measures how quickly a user hears a beep after pushing the PTT button and how quickly the user's voice reaches a called party. Current 4G PTT applications have push to hear delays of approximately 1.5 to 2 seconds, which creates a poor user experience.

Figure 1:
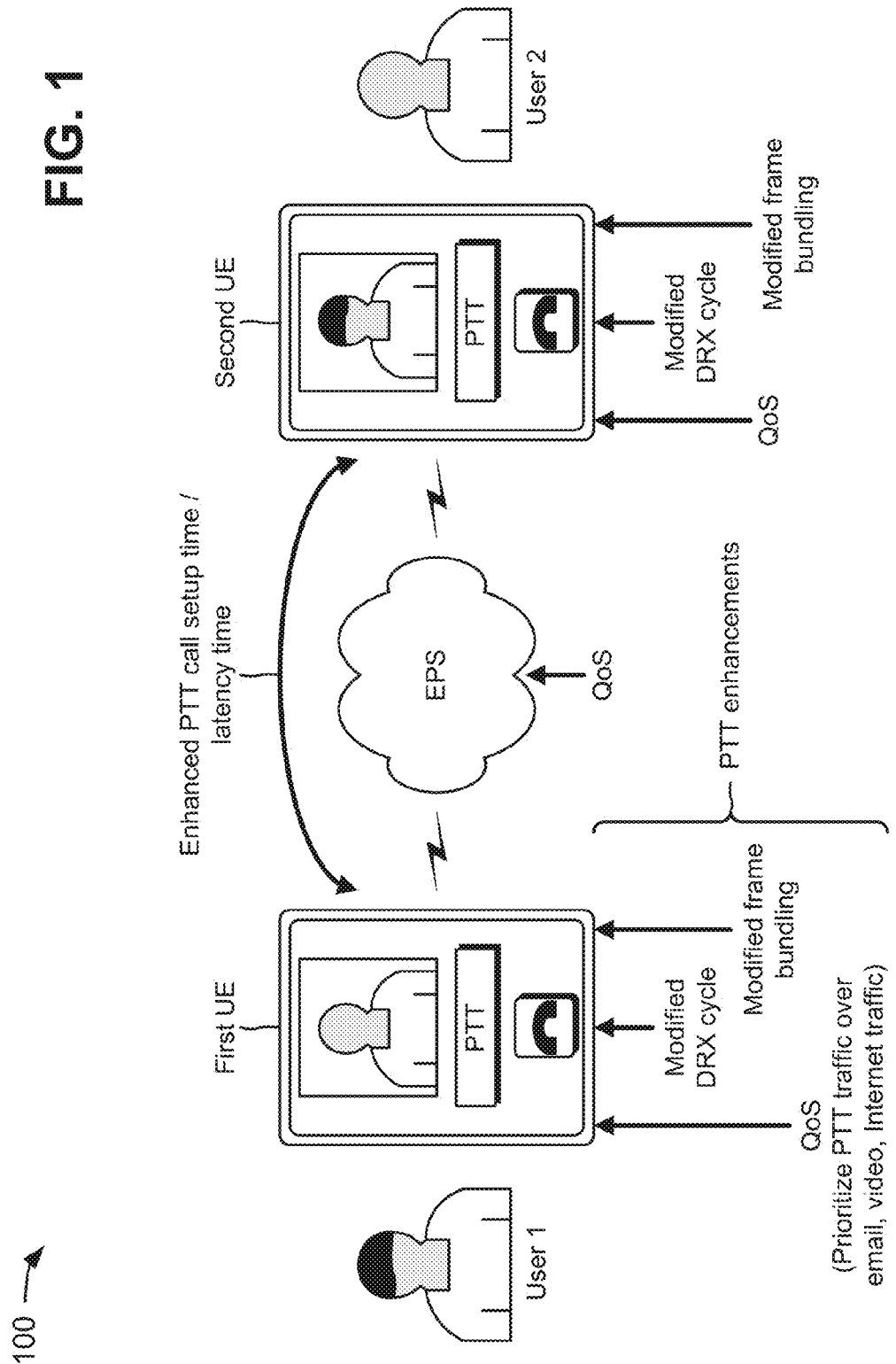
FIG. 1 is a diagram of an overview of an example implementation described herein.

FIG. 1 is a diagram of an overview of an example implementation 100 described herein. As shown, a first user may be associated with a first UE, and a second user may be associated with a second UE. The first UE and the second UE may connect to an EPS that includes a RAN, an EPC network, an IMS network, and a PDN. The first UE and the second UE may include a PTT application that enables the first user and the second user to establish and conduct a PTT call (or session) via the EPS.

As further shown in FIG. 1, the PTT application in both the first UE and the second UE may be enhanced to improve the PTT session. For example, the first UE and the second UE may utilize the IMS network of the EPS, rather than the public Internet, to establish and conduct PTT sessions. Unlike the public Internet, the IMS network may permit the first UE and the second UE to utilize QoS with respect to PTT sessions. In some implementations, the QoS may include prioritizing PTT traffic over other types of traffic, such as, for example, email, video, and Internet traffic.

As further shown, the first UE and the second UE may be enhanced by permitting the first UE and the second UE to modify a Discontinuous Receive (DRX) cycle timer. The DRX cycle timer may include a timer that dictates when a UE checks a network for traffic. For example, a UE may check a network for traffic after expiration of the DRX cycle timer. In some implementations, the first UE and the second UE may decrease the DRX cycle timer (e.g., relative to what is used in public Internet-based PTT) so that the first UE and the second UE check the EPS for traffic (e.g., PTT traffic) more frequently. This may enable the first UE and the second UE to more quickly receive PTT traffic from the EPS, and to become aware of incoming PTT calls faster, which may result in shorter initial call setup times (e.g., relative to public Internet-based PTT).

As further shown in FIG. 1, the first UE and the second UE may be enhanced by permitting the first UE and the second UE to modify frame bundling of PTT traffic. Frame bundling may include combining packets into longer frames so that a number of frames, and therefore the overhead, may be reduced on a network. In some implementations, the first UE and the second UE may modify a number of PTT packets that are bundled together in order to optimize latency across the EPS. For example, the first UE and the second UE may decrease the number of PTT packets that are bundled together in order to improve latency and/or voice quality.

In example implementation 100, assume that the first user utilizes the PTT application of the first UE to establish a PTT session with the second UE and the second user. As shown in FIG. 1, the PTT enhancements to the first UE and the second UE may improve a call setup time for establishing the PTT session, and may improve a latency time associated with the PTT session. Thus, the first user and the second user may establish and conduct the PTT session without the significant delays provided in current 4G PTT applications.

Such PTT enhancements may permit prioritization of PTT traffic over other types of traffic, such as email, video, Internet, etc. traffic. This may provide improved PTT call setup time and/or latency time over current 4G PTT implementations, which may improve the PTT user experience. For example, the PTT enhancements may provide push to hear delays of approximately less than one second.

Figure 2:
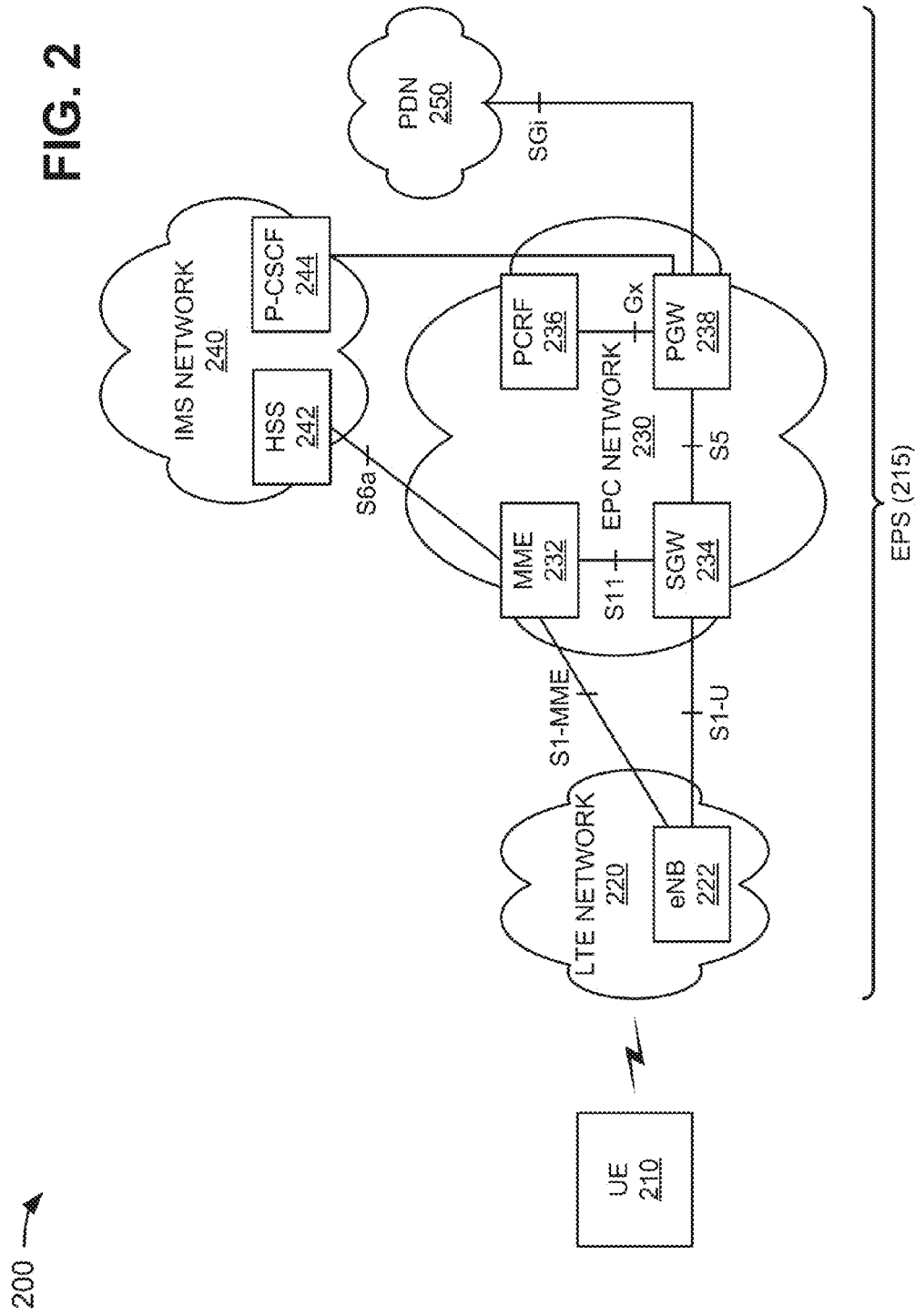
FIG. 2 is a diagram of an example environment in which systems and/or methods described herein may be implemented.

FIG. 2 is a diagram of an example environment 200 in which systems and/or methods described herein may be implemented. As illustrated, environment 200 may include a UE 210 and an EPS 215 that includes a LTE network 220, an EPC network 230, an IMS network 240, and a PDN 250. LTE network 220 may include an eNodeB (eNB) 222. EPC network 230 may include a mobility management entity (MME) 232, a serving gateway (SGW) 234, a policy and charging rules function (PCRF) 236, and a PDN gateway (PGW) 238. IMS network 240 may include a home subscriber server (HSS) 242 and a proxy call session control function (P-CSCF) 244. Devices/networks of environment 200 may connect via wired connections, wireless connections, or a combination of wired and wireless connections.

As further shown in FIG. 2, eNB 222 may connect with MME 232 over a S1-MME interface, and may connect with SGW 234 over a S1-U interface. MME 232 may connect with SGW 234 over a S11 interface, and may connect with HSS 242 over a S6a interface. SGW 234 may connect with PGW 238 over a S5 interface. PCRF 236 may connect with PGW 238 over a Gx interface. PGW 238 may connect with PDN 250 over a SGi interface, and may connect with P-CSCF 244. Other connections, not shown in FIG. 2, may also be utilized by EPS 215. For example, multiple MMEs 232 may connect with one another over S10 interfaces.

UE 210 may include a device that is capable of communicating over LTE network 220, EPC network 230, and/or IMS network 240. In some implementations, UE 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a landline telephone; or another type of computation and communication device.

EPS 215 may include is a core network architecture of the 3GPP LTE wireless communication standard. EPS 215 may include LTE network 220, EPC network 230, IMS network 240, and PDN 250.

LTE network 220 may include a communications network that connects users (e.g., UE 210) to a service provider network. In some implementations, LTE network 220 may include a wireless local area network (WLAN) or another type of access network (e.g., an E-UTRAN or an eHRPD network). In some implementations, LTE network 220 may include a radio access network capable of providing a particular data rate, a particular latency, packet optimization, a particular capacity and coverage, etc.

eNB 222 may include one or more computation and communication devices, such as a base station, that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include an IP packet-switched core network that supports high-speed wireless and wireline broadband access technologies. In some implementations, EPC network 230 may provide packet-switched voice services (e.g., which are traditionally circuit-switched) using IMS network 240 and PDN 250.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attach and at a time of intra-LTE handover. In some implementations, MME 232 may authenticate UE 210. Non-access stratum (NAS) signaling may terminate at MME 232, and MME 232 may generate and allocate temporary identities to UEs 210. MME 232 may check authorization of UE 210 to utilize LTE network 220 and may enforce roaming restrictions for UE 210. MME 232 may be a termination point in EPC network 230 for ciphering/integrity protection for NAS signaling and may handle security key management. MME 232 may provide a control plane function for mobility between LTE network 220 and other access networks with a S3 interface terminating at MME 232.

SGW 234 may include one or more devices that route and forward user data packets, may act as a mobility anchor for a user plane during inter-eNB handovers, and may act as an anchor for mobility between LTE and other 3GPP technologies. For idle state UEs 210, SGW 234 may terminate a downlink data path and may trigger paging when downlink data arrives for UE 210. SGW 234 may manage and store contexts associated with UE 210 (e.g., parameters of an IP bearer service, network internal routing information, etc.). In some implementations, SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic.

PCRF 236 may include one or more computation and communication devices that provide policy control decision and flow based charging control functionalities. PCRF 236 may provide network control regarding service data flow detection, gating, QoS and flow based charging, etc. In some implementations, PCRF 236 may determine how a certain service data flow shall be treated, and may ensure that user plane traffic mapping and treatment is in accordance with a user's subscription profile.

PGW 238 may include one or more devices that provide connectivity of UE 210 to external packet data networks by being a traffic exit/entry point for UE 210. UE 210 may simultaneously connect to more than one PGW 238 for accessing multiple PDNs 250. PGW 238 may perform policy enforcement, packet filtering for each user, charging support, lawful intercept, and packet screening. PGW 238 may also act as an anchor for mobility between 3GPP and non-3GPP technologies. In some implementations, PGW 238 may include one or more traffic transfer devices (or network devices), such as a gateway, a router, a switch, a firewall, a NIC, a hub, a bridge, a proxy server, an OADM, or some other type of device that processes and/or transfers traffic.

IMS network 240 may include an architectural framework or network (e.g., a telecommunications network) for delivering IP multimedia services. In some implementations, IMS network 240 may include a standardized reference architecture that provides session control, a connection control and an applications services framework, and user and services data.

HSS 242 may include one or more computation and communication devices that provide a master user database that supports devices of IMS network 240 that handle calls. HSS 242 may contain subscription-related information (e.g., user profiles), may perform authentication and authorization of a user, and may provide information about a user's location and IP information.

P-CSCF 244 may include one or more computation and communication devices that function as a proxy server for UE 210, where SIP signaling traffic to and from UE 210 may go through P-CSCF 244. In some implementations, P-CSCF 244 may validate and then forward requests from UE 210, and may process and forward responses to UE 210.

PDN 250 may include one or more data communications networks that are based on packet switching, as opposed to circuit switching that is used in public telephone networks. In some implementations, PDN 250 may be capable of communicating with UE 210 over IMS network 240.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
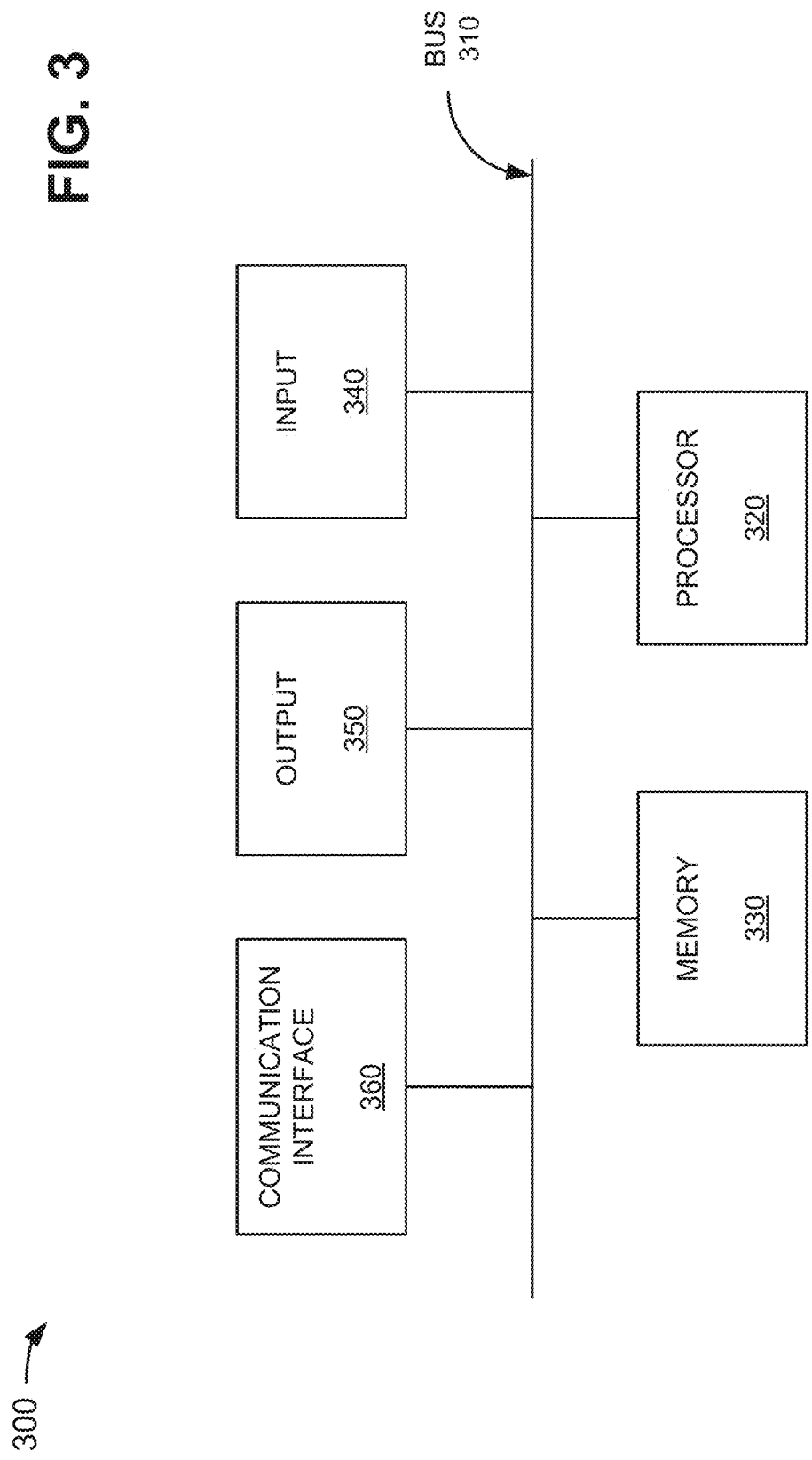
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
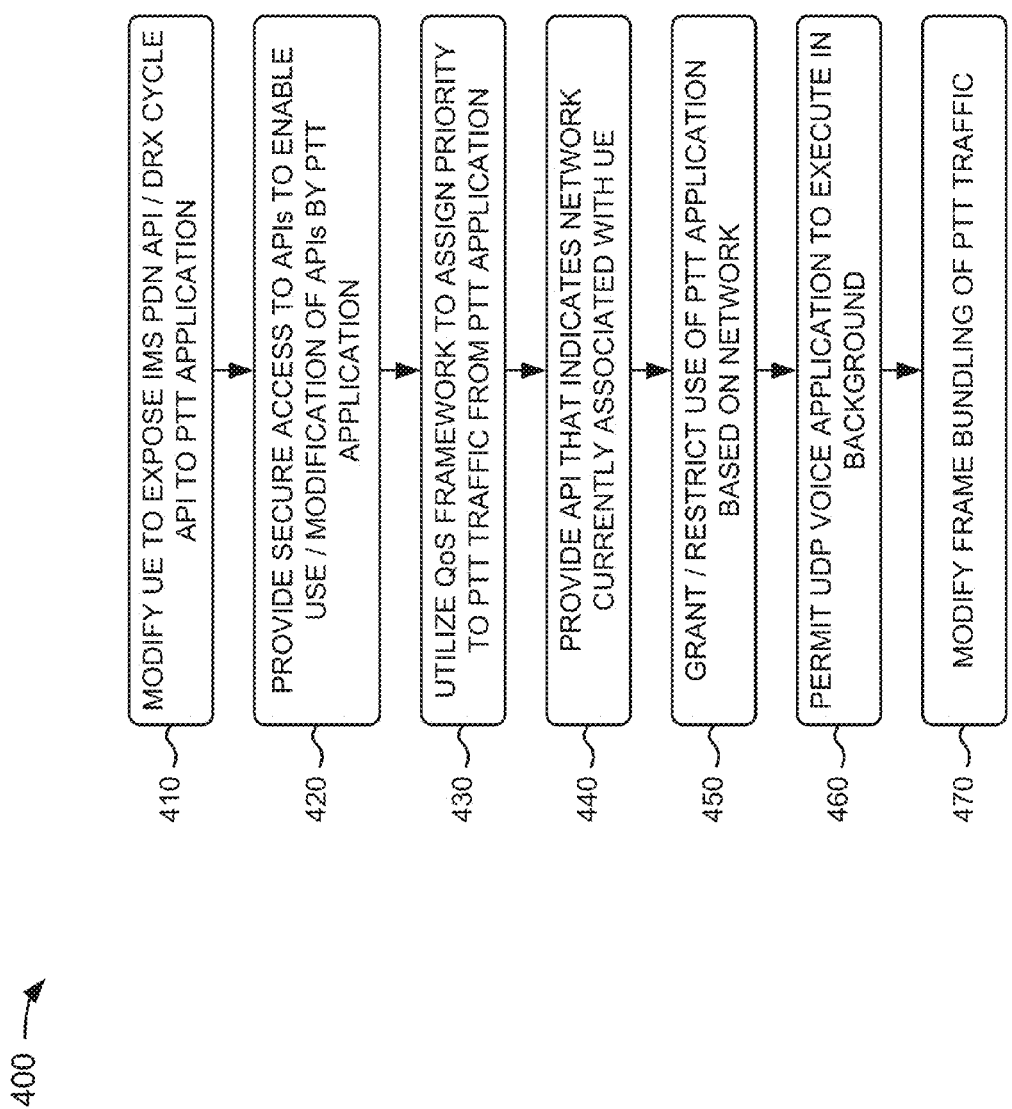
FIG. 4 is a flow chart of an example process for modifying a UE to provide enhanced PTT services.

FIG. 4 is a flow chart of an example process 400 for modifying a UE to provide enhanced PTT services. In some implementations, one or more process blocks of FIG. 4 may be performed by UE 210. In some implementations, one or more process blocks of FIG. 4 may be performed by another device or a group of devices separate from or including UE 210.

As shown in FIG. 4, process 400 may include modifying a UE to expose an IMS PDN application programming interface (API) and a DRX cycle API to a PTT application (block 410). For example, UE 210 may include a PTT application that enables UE 210 to establish and conduct PTT sessions with other UEs 210. In some implementations, UE 210 may include an IMS PDN API that enables UE 210 to establish a data connection with PDN 250 over IMS network 240, as opposed to over the public Internet. For example, the IMS PDN API may enable the PTT application to make a data connection with PDN 250 over IMS network 240. In some implementations, UE 210 may include several hidden or unexposed APIs that may not be viewed or altered by applications provided in UE 210. However, the IMS PDN API may be exposed by UE 210 so that the PTT application may utilize the IMS PDN API to establish a data connection with PDN 250 over IMS network 240.

In some implementations, UE 210 may include a DRX cycle API that controls a DRX cycle timer associated with UE 210. The DRX cycle timer may include a timer that dictates when UE 210 checks a network for traffic (e.g., UE 210 may check a network for traffic after expiration of the DRX cycle timer). In some implementations, the DRX cycle API may be exposed by UE 210 so that the PTT application may modify the DRX cycle timer. For example, UE 210 may decrease the DRX cycle timer so that UE 210 checks EPS 215 for traffic (e.g., PTT traffic) more frequently. This may enable UE 210 to more quickly receive PTT traffic from EPS 215.

As further shown in FIG. 4, process 400 may include providing secure access to the IMS PDN API and the DRX cycle API to enable use and/or modification of the IMS PDN API and the DRX cycle API by the PTT application (block 420). For example, UE 210 may include a security application that provides secure access to exposed APIs in UE 210. In some implementations, the security application may provide secure access to the IMS PDN API and the DRX cycle API by the PTT application. In some implementations, the security application may prevent unauthorized applications from accessing the IMS PDN API and the DRX cycle API.

For example, the security application may include authentication credentials (e.g., a certificate, a signature, an authentication key, a security token, etc.) that may be utilized to authenticate applications attempting to access the IMS PDN API and/or the DRX cycle API. The security application may request that a particular application attempting to access the IMS PDN API and/or the DRX cycle API provide authentication credentials. If the authentication credentials provided by the particular application match the authentication credentials of the security application, the security application may authenticate the particular application for accessing the IMS PDN API and/or the DRX cycle API. If the authentication credentials provided by the particular application fail to match the authentication credentials of the security application, the security application may not authenticate the particular application for accessing the IMS PDN API and/or the DRX cycle API.

In some implementations, the PTT application may be installed in UE 210 by a manufacturer of UE 210, by a network service provider, or may be downloaded and installed in UE 210 by a user of UE 210. When the PTT application is installed in UE 210, the PTT application may be provided with authentication credentials that match the authentication credentials of the security application. Therefore, the security application may authenticate the PTT application for accessing the IMS PDN API and/or the DRX cycle API. When the PTT application is authenticated for access to the IMS PDN API and the DRX cycle API, the PTT application may utilize and/or modify the IMS PDN API and the DRX cycle API. In some implementations, the PTT application may utilize the IMS PDN API to establish a data connection (e.g., set up data routes) with PDN 250 over IMS network 240. The PTT application may utilize the data connection over IMS network 240 to implement a QoS framework for PTT traffic associated with the PTT application.

In some implementations, when the PTT application is installed in UE 210 or when UE 210 receives a tracking area update (TAU) (e.g., a TAU may be performed periodically or when UE 210 moves to another set of cells or tracking area) from EPS 215, the PTT application may access the DRX cycle API in order to modify the DRX cycle API. For example, the PTT application may modify the DRX cycle timer provided in the DRX cycle API. In some implementations, the PTT application may decrease the DRX cycle timer so that UE 210 checks EPS 215 for traffic (e.g., PTT traffic) more frequently (e.g., every so many milliseconds, seconds, minutes, etc.). This may enable UE 210 to more quickly receive PTT traffic from EPS 215, such as an incoming PTT call, which may result in shorter call setup times (e.g., relative to public Internet-based PTT).

In some implementations, the PTT application may restore the DRX cycle timer to a configurable default value based on particular conditions. For example, the PTT application may restore the DRX cycle timer to the default value when UE 210 is connected to an access network other than LTE network 220. In such an example, the PTT application may modify the DRX cycle timer again when UE 210 reconnects to LTE network 220.

In some implementations, if the PTT application is removed or uninstalled from UE 210, or if the PTT application is turned off or disabled (e.g., by the user), the security application may reset the DRX cycle timer to a configurable default value that may reduce battery usage in UE 210. For example, the default value of the DRX cycle timer may include a value that causes UE 210 to check EPS 215 for traffic less frequently, which may conserve battery usage in UE 210. In some implementations, the security application may read a default DRX value that is being broadcasted by EPS 215, and may use the default DRX value to change the DRX cycle timer of UE 210 to the default value. This may reset the DRX cycle timer of UE 210 to a default value which EPS 215 wants devices to use (e.g., when using the default value). In some implementations, if the PTT application is turned on or enabled (e.g., by the user), the PTT application may decrease the DRX cycle timer so that UE 210 checks EPS 215 for traffic (e.g., PTT traffic) more frequently (e.g., every so many milliseconds, seconds, minutes, etc.).

In some implementations, if the PTT application is removed from UE 210, or if the PTT application is turned off or disabled (e.g., by the user), the security application may remove any data routes set up by the PTT application via the IMS PDN API. In some implementations, if the PTT application is turned on or enabled (e.g., by the user), the PTT application may utilize the IMS PDN API to establish another data connection (e.g., set up data routes) with PDN 250 over IMS network 240.

As further shown in FIG. 4, process 400 may include utilizing a QoS framework to assign priority to PTT traffic from the PTT application (block 430). For example, UE 210 may utilize a QoS framework to assign priority to PTT traffic associated with the PTT application. In some implementations, since the IMS PDN API may permit the PTT application to establish a data connection with PDN 250 over IMS network 240, the PTT application may utilize the data connection over IMS network 240 to implement a QoS framework for PTT traffic associated with the PTT application. For example, the PTT application may prioritize PTT traffic over best effort traffic, such as, for example, email traffic, video traffic, Internet traffic, etc., as PTT traffic traverses IMS network 240 and PDN 250. In some implementations, QoS bearers may be defined in IMS network 240 and may be set up statically when UE 210 registers with IMS network 240. In some implementations, the QoS bearers may be set up dynamically when UE 210 utilizes the PTT application to make a PTT call.

In some implementations, the PTT traffic may be prioritized after guaranteed bit rate (GBR) conversational audio (e.g., voice-over-IP (VoIP) traffic); before non-GBR variable bit rate video traffic; before non-GBR standard video telephony, video streaming, and general best effort traffic; and before non-GBR machine-to-machine (M2M) traffic. By prioritizing the PTT traffic over the non-GBR traffic, the PTT application may reduce latency times associated with PTT sessions.

As further shown in FIG. 4, process 400 may include providing an API that indicates network currently associated with the UE (block 440). For example, UE 210 may include an MCC/MNC API that notifies the PTT application about a mobile country code (MCC) and a mobile network code (MNC) currently associated with UE 210. A MCC may include a short numeric code that identifies a country of a particular location, and MNC may include a short numeric code that identifies a particular mobile network operator. The combination of a MCC and a MNC (e.g., a MCC/MNC tuple) may be used to uniquely identify a network to which UE 210 is currently connected. In some implementations, the MCC/MNC API may notify the PTT application about the network to which UE 210 is currently connected. In some implementations, when the MCC/MNC tuple changes and indicates that UE 210 is connected to a different network, the PTT application may utilize the DRX cycle API to restore the DRX cycle timer to the default value.

As further shown in FIG. 4, process 400 may include granting or restricting use of the PTT application based on the network (block 450). For example, the PTT application may utilize the MCC/MNC tuple to identify the network to which UE 210 is currently connected. In some implementations, the PTT application may permit or prevent use of the PTT application based on the network to which UE 210 is currently connected. For example, the PTT application may permit use of the PTT application when the MCC/MNC tuple indicates that UE 210 is currently connected to LTE network 220. The PTT application may prevent use of the PTT application when the MCC/MNC tuple indicates that UE 210 is roaming or is currently connected to a wireless local area network (WLAN), such as, for example, an IEEE 802.11 (e.g., Wi-Fi) network.

As further shown in FIG. 4, process 400 may include permitting a user datagram protocol (UDP) voice application to execute in the background (block 460). For example, UE 210 may be provisioned to permit a UDP voice application to execute in the background of UE 210, under all conditions. In some implementations, the UDP voice application may include a VoIP application, such as, for example, Skype, iChat, Gizmo, etc. In some implementations, UE 210 may continuously execute the UDP voice application in the background of UE 210, may not suspend the UDP voice application when UE 210 enters sleep mode, and may not terminate the UDP voice application when the user quits the UDP voice application. This may ensure that the UDP voice application is available for the PTT application under all conditions (e.g., after device power up), and will make the PTT application aware of incoming PTT calls.

As further shown in FIG. 4, process 400 may include modifying frame bundling of PTT traffic (block 470). For example, the PTT application of UE 210 may be permitted to modify frame bundling of PTT traffic. Frame bundling may include combining packets into longer frames so that a number of frames, and therefore the overhead, may be reduced on a network. In some implementations, the PTT application may modify a number of PTT packets that are bundled together in order to optimize latency across EPS 215. For example, the PTT application may decrease the number of PTT packets that are bundled together in frames in order to improve latency and/or voice quality. In some implementations, frame bundling of PTT traffic may involve balancing between bundling too many packets together in one frame (e.g., which may result in the PTT application's jitter buffer overflowing) and not bundling enough packets together in one frame (e.g., which may result in the PTT application's jitter buffer emptying too quickly), both of which may result in degraded voice.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
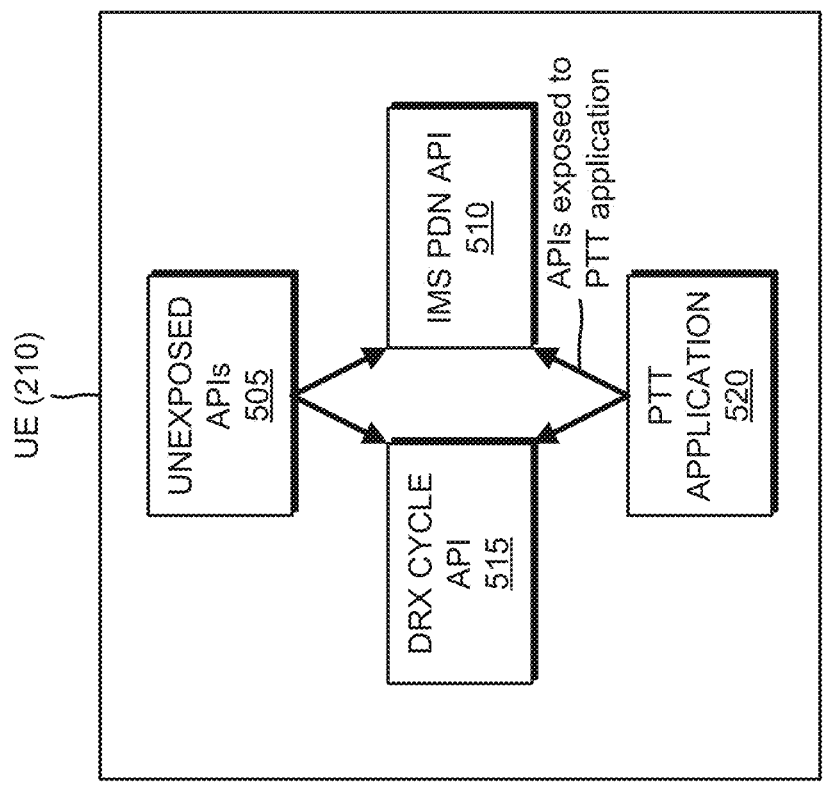

FIGS. 5A-5E are diagrams of an example 500 relating to example process 400 shown in FIG. 4. In example 500, assume that UE 210 includes unexposed APIs 505 that are hidden from a user of UE 210 and/or applications executing on UE 210, as shown in FIG. 5A. Unexposed APIs 505 may include an IMS PDN API 510 that enables UE 210 to establish a data connection with PDN 250 over IMS network 240, and a DRX cycle API 515 that controls a DRX cycle timer associated with UE 210. As further shown in FIG. 5A, IMS PDN API 510 and DRX cycle API 515 may be exposed to a PTT application 520 that enables UE 210 to establish and conduct PTT sessions with other UEs 210. IMS PDN API 510 and DRX cycle API 515 may be exposed to PTT application 520 so that PTT application 520 may utilize and/or modify IMS PDN API 510 and/or DRX cycle API 515.

Figure 5B:
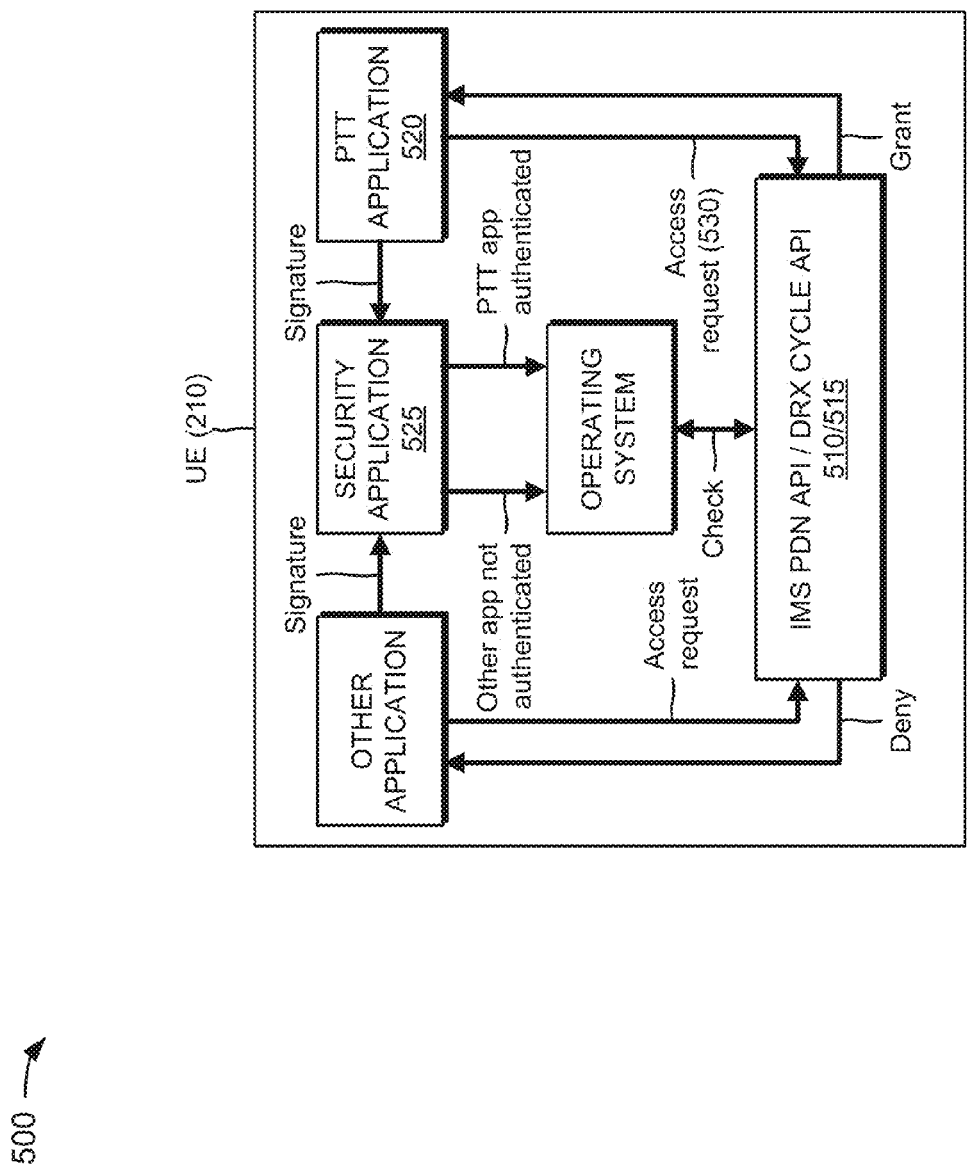

As shown in FIG. 5B, UE 210 may include a security application 525 that determines whether an application is authenticated for accessing IMS PDN API 510 and/or DRX cycle API 515. Security application 525 may include a signature that is utilized to authenticate applications attempting to access IMS PDN API 510 and/or DRX cycle API 515. As further shown in FIG. 5B, PTT application 520 may provide a signature to security application 525, and another application may provide another signature to security application 525. Assume that security application 525 determines that the signature provided by PTT application 520 matches the signature of security application 525. Accordingly, security application 525 may determine that PTT application 520 is authenticated for accessing IMS PDN API 510 and/or DRX cycle API 515, and may provide this information to an operating system of UE 210. Further, assume that security application 525 determines that the other signature provided by the other application does not match the signature of security application 525. Accordingly, security application 525 may determine that the other application is not authenticated for accessing IMS PDN API 510 and/or DRX cycle API 515, and may provide this information to the operating system.

As further shown in FIG. 5B, PTT application 520 may provide an access request 530 to IMS PDN API 510 and/or DRX cycle API 515, and IMS PDN API 510 and/or DRX cycle API 515 may check, based on access request 530, with the operating system to determine whether PTT application 520 is authenticated for accessing IMS PDN API 510 and/or DRX cycle API 515. Since PTT application 520 is authenticated, PTT application 520 may be granted access to IMS PDN API 510 and/or DRX cycle API 515. The other application may provide another access request to IMS PDN API 510 and/or DRX cycle API 515. IMS PDN API 510 and/or DRX cycle API 515 may check, based on the other access request, with the operating system to determine whether the other application is authenticated for accessing IMS PDN API 510 and/or DRX cycle API 515. Since the other application is not authenticated, the other application may be denied access to IMS PDN API 510 and/or DRX cycle API 515.

With reference to FIG. 5C, UE 210 may utilize a QoS framework to assign priority to PTT traffic associated with PTT application 520. As shown in FIG. 5C, a first QoS framework 535 may include a framework with an application type field, a quality control index (QCI) field, and a bearer characteristics field. First QoS framework 535 may prioritize traffic associated with EPS 215, but may not implement QoS for PTT traffic. For example, IMS signaling, session initiation protocol (SIP) signaling, and other signaling may be prioritized first; VoIP and the audio part of video telephony may be prioritized second; enhanced video telephony may be prioritized third; public safety data applications and enterprise user traffic may be prioritized fourth; best effort Internet traffic and standard video telephony may be prioritized fifth; and slightly less than best effort Internet traffic and M2M traffic may be prioritized sixth. Without QoS, PTT traffic may be prioritized fifth with the best effort Internet traffic and the standard video telephony.

As further shown in FIG. 5C, a second QoS framework 540 may prioritize traffic associated with EPS 215, and may implement QoS for PTT traffic. For example, PTT IMS signaling, SIP signaling, and other signaling, may be prioritized first; VoIP and the audio part of video telephony may still be prioritized second; enhanced video telephony may still be prioritized third; public safety data applications, enterprise user traffic, and PTT traffic may be prioritized fourth; best effort Internet traffic and standard video telephony may still be prioritized fifth; and slightly less than best effort Internet traffic and M2M traffic may still be prioritized sixth. With QoS, PTT traffic may be prioritized second (e.g., for IMS signaling) and fourth with the public safety data applications and the enterprise user traffic. Thus, UE 210 may prioritize PTT traffic over the best effort traffic, such as, for example, email traffic, video traffic, Internet traffic, etc., as PTT traffic traverses IMS network 240 and PDN 250.

As shown in FIG. 5D, UE 210 may include a MCC/MNC API 545 that notifies PTT application 520 about a MCC and a MNC currently associated with UE 210. MCC/MNC API 545 may receive a MCC and a MNC (e.g., a MCC/MNC tuple) from EPS 215, and may utilize the MCC/MNC tuple to identify a network to which UE 210 is currently connected. MCC/MNC API 545 may notify PTT application 520 about the network to which UE 210 is currently connected, as further shown in FIG. 5D. PTT application 520 may permit or prevent use of PTT application 520 based on the network to which UE 210 is currently connected. For example, as indicated by reference number 550 in FIG. 5D, PTT application 520 may be disabled when UE 210 is roaming or is currently connected to a WLAN, such as a Wi-Fi network.

Figure 5E:
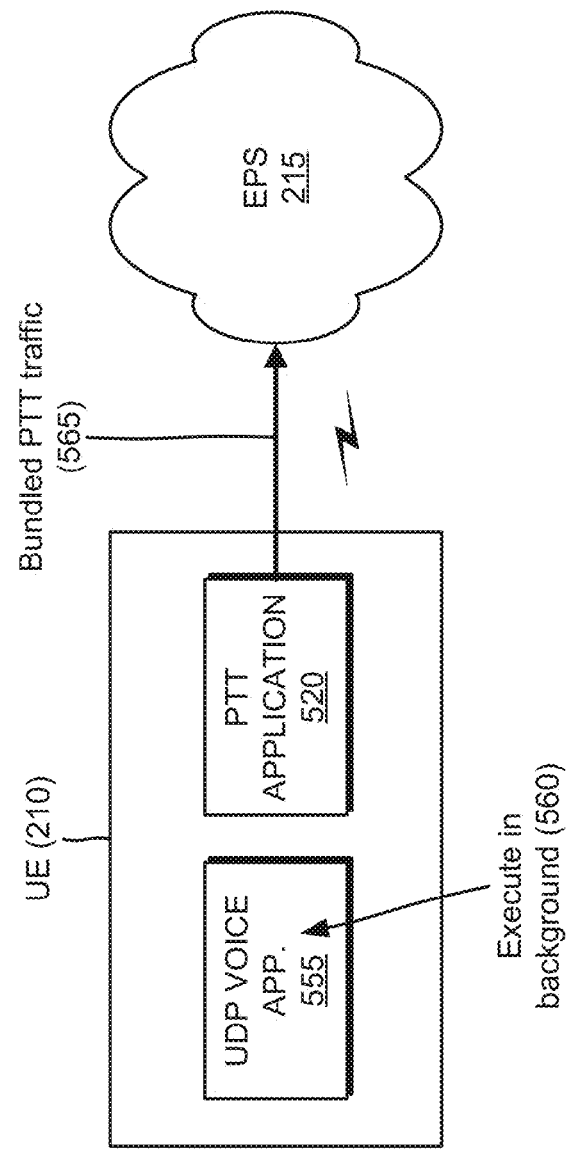

As shown in FIG. 5E, UE 210 may include a UDP voice application 555, and may permit UDP voice application 555 to continuously execute in the background of UE 210, as indicated by reference number 560. As further shown in FIG. 5E, PTT application 520 may utilize frame bundling of PTT traffic to generate bundled PTT traffic 565, and may provide bundled PTT traffic 565 to EPS 215. PTT application 520 may modify a number of PTT packets that are bundled together in order to optimize latency across EPS 215.

As indicated above, FIGS. 5A-5E are provided merely as an example. Other examples are possible and may differ from what was described with regard to FIGS. 5A-5E.

Figure 6:
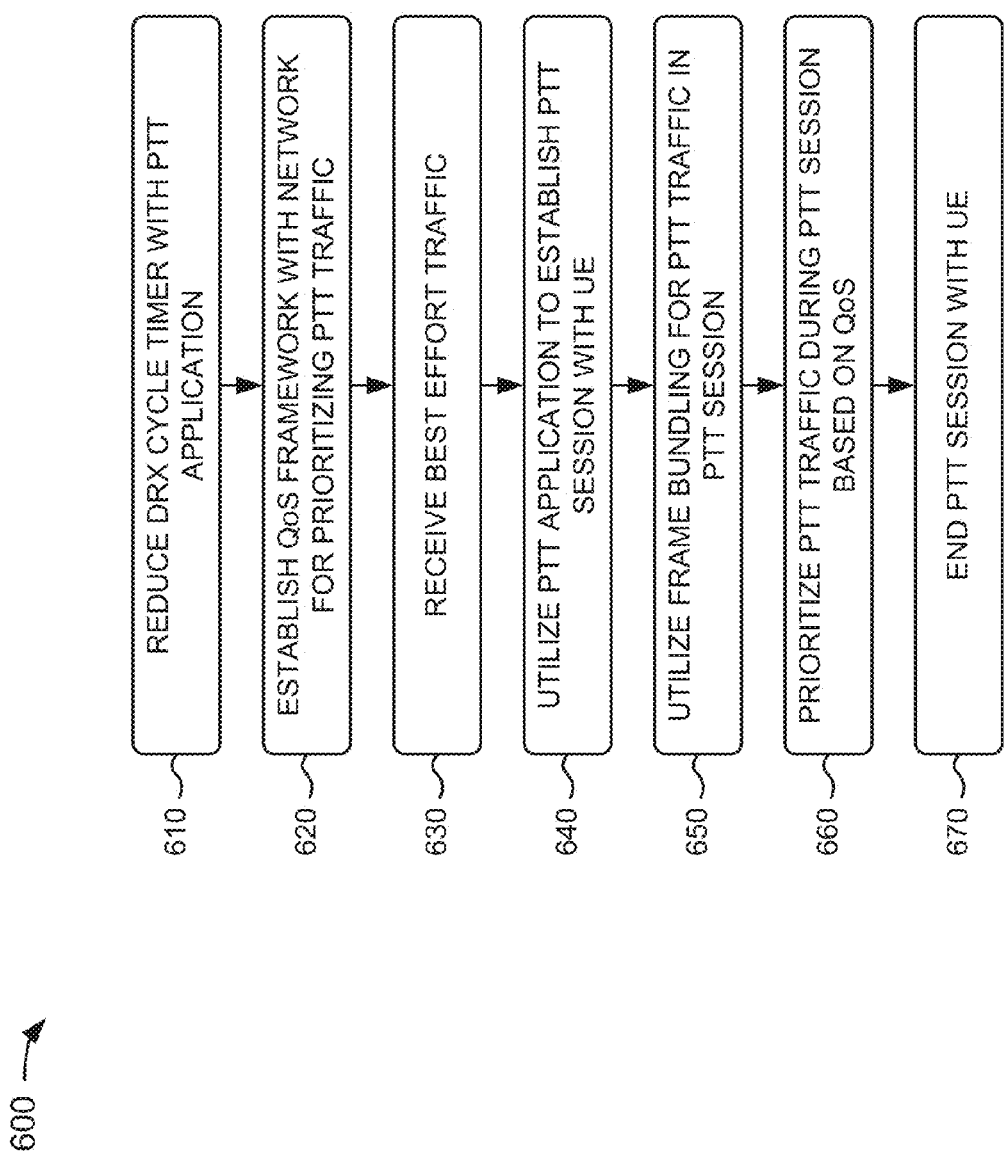
FIG. 6 is a flow chart of an example process for establishing and conducting a PTT session with another UE.

FIG. 6 is a flow chart of an example process 600 for establishing and conducting a PTT session with another UE. In some implementations, one or more process blocks of FIG. 6 may be performed by UE 210. In some implementations, one or more process blocks of FIG. 6 may be performed by another device or a group of devices separate from or including UE 210.

As shown in FIG. 6, process 600 may include reducing a DRX cycle timer with a PTT application (block 610). For example, the PTT application of UE 210 may access the DRX cycle API, and may reduce the DRX cycle timer provided in the DRX cycle API. In some implementations, the security application may provide secure access to the DRX cycle API by the PTT application. In some implementations, the PTT application may decrease the DRX cycle timer so that UE 210 checks EPS 215 for traffic (e.g., PTT traffic) more frequently (e.g., every so many milliseconds, seconds, minutes, etc.). This may enable UE 210 to more quickly receive PTT traffic from EPS 215, such as an incoming PTT call, which may result in shorter call setup times (e.g., relative to public Internet-based PTT).

As further shown in FIG. 6, process 600 may include establishing a QoS framework with a network for prioritizing PTT traffic (block 620). For example, UE 210 may connect to PDN 250 over IMS network 240 and via LTE network 220 and EPC network 230. In some implementations, the PTT application of UE 210 may establish a QoS framework with EPS 215 (e.g., with IMS network 240) that prioritizes PTT traffic associated with the PTT application. For example, the PTT application may prioritize PTT traffic over best effort traffic (e.g., email traffic, video traffic, Internet traffic, etc.), as the PTT traffic traverses IMS network 240 and PDN 250.

As further shown in FIG. 6, process 600 may include receiving best effort traffic (block 630). For example, a user may utilize UE 210 to create and send an email (e.g., email traffic), browse the Internet (e.g., Internet traffic), stream a video (e.g., video traffic), etc. The email traffic, the Internet traffic, and the video traffic may be referred to as best effort traffic. In some implementations, UE 210 may generate the best effort traffic, and may provide the best effort traffic to EPS 215. In some implementations, UE 210 may receive the best effort traffic by, for example, receiving an email, receiving a video, receiving a web page from the Internet, etc.

As further shown in FIG. 6, process 600 may include utilizing a PTT application to establish a PTT session with a UE (block 640). For example, the user may instruct UE 210 to execute the PTT application, and the user may utilize the PTT application to establish a PTT session with another UE 210. In some implementations, the PTT application may display a list of available PTT contacts associated with the user, and the user may select a PTT contact associated with the other UE 210 from the list. When the user selects the PTT contact, the PTT application may cause UE 210 to generate a PTT call destined for the other UE 210. In some implementations, UE 210 may provide the PTT call to the other UE 210 via EPS 215. If the PTT contact accepts the PTT call, a PTT session may be established between UE 210 and the other UE 210. If the PTT contact does not accept the PTT call, a PTT session may not be established between UE 210 and the other UE 210.

In some implementations, UE 210 may receive a PTT call from the other UE 210, and may execute the PTT application based on receiving the PTT call. Based on the PTT call, the PTT application may display information indicating that the other UE 210 is trying to establish a PTT session with UE 210. If the user accepts the PTT call, a PTT session may be established between UE 210 and the other UE 210. If the user does not accept the PTT call, a PTT session may not be established between UE 210 and the other UE 210.

As further shown in FIG. 6, process 600 may include utilizing frame bundling for PTT traffic in the PTT session (block 650). For example, the PTT application of UE 210 may utilize frame bundling for PTT traffic associated with the PTT session with the other UE 210. In some implementations, a PTT application of the other UE 210 may also utilize frame bundling for PTT traffic associated with the PTT session. In some implementations, the PTT applications may modify a number of PTT packets that are bundled together in order to optimize latency across EPS 215 for the PTT session. For example, the PTT applications may decrease the number of PTT packets that are bundled together in frames in order to improve latency and/or voice quality for the PTT session.

As further shown in FIG. 6, process 600 may include prioritizing the PTT traffic during the PTT session and based on the QoS framework (block 660). For example, during the PTT session, UE 210 may prioritize the PTT traffic over other traffic (e.g., best effort traffic) based on the QoS framework established with EPS 215. In some implementations, during the PTT session, the other UE 210 may also prioritize the PTT traffic over any best effort traffic associated with the other UE 210, based on the QoS framework established with EPS 215. In some implementations, the PTT traffic, in the PTT session with the other UE 210, may be prioritized before non-GBR traffic, such as, for example, variable bit rate video traffic, standard video telephony traffic, video streaming traffic, general best effort traffic, and M2M traffic. By prioritizing the PTT traffic over the non-GBR traffic, the PTT application may reduce latency times associated with PTT session with the other UE 210.

In some implementations, the combination of the reduced DRX cycle timer, the QoS framework for PTT traffic, and the frame bundling of PTT traffic may provide improved PTT call setup time and/or latency time over current 4G PTT implementations, which may improve the PTT user experience for the users of UE 210 and the other UE 210. For example, the combination may enable the user of UE 210 to experience push to hear delays of approximately less than one second during the PTT session with the other UE 210. In some implementations, the combination may enable the user of the other UE 210 to experience push to hear delays of approximately less than one second during the PTT session with UE 210.

As further shown in FIG. 6, process 600 may include ending the PTT session with the UE (block 670). For example, the user of UE 210 may end the PTT session with the other UE 210 by selecting a mechanism (e.g., an end call button, icon, link, etc.) displayed by the PTT application during the PTT session. In some implementations, when the user of UE 210 selects the end call mechanism, UE 210 may terminate the PTT session with the other UE 210, and may display information associated with the PTT application to the user. In some implementations, UE 210 may display other information (e.g., best effort traffic, a home page, etc.) to the user when the PTT session is terminated. In some implementations, the user of the other UE 210 may end the PTT session with UE 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
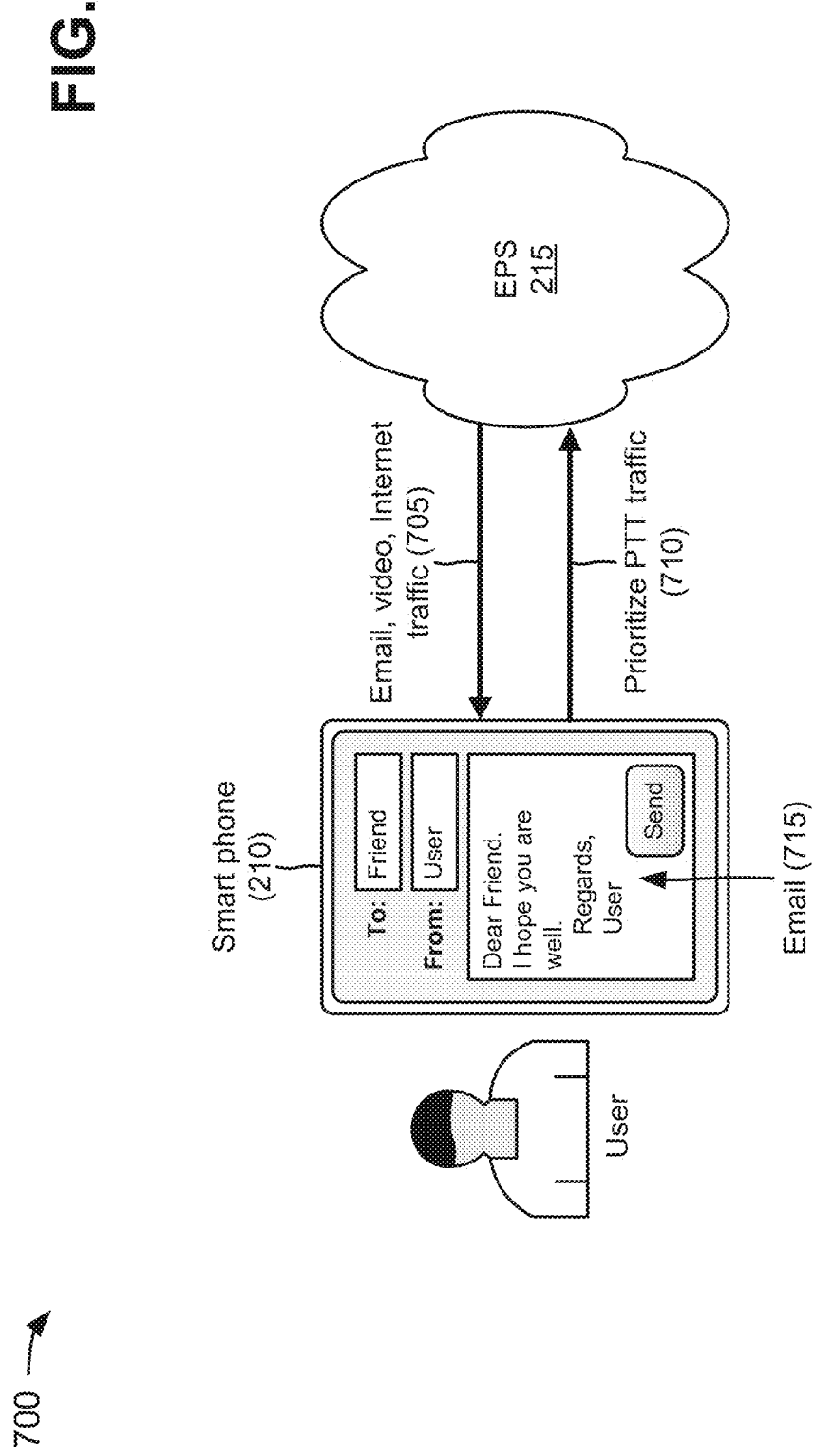

FIGS. 7A-7F are diagrams of an example 700 relating to example process 600 shown in FIG. 6. As shown in FIG. 7A, assume that a user is associated with UE 210 (e.g., a smart phone 210), and that smart phone 210 receives email, video, and/or Internet traffic 705 from EPS 215. Further, assume that smart phone 210 establishes a QoS framework with EPS 215 so that PTT traffic 710 associated with smart phone 210 may be prioritized over traffic 705. As further shown in FIG. 7A, the user may utilize smart phone 210 to create an email message 715 to a friend of the user.

As shown in FIG. 7B, while the user is creating email message 715, smart phone 210 may check EPS 215 for information (e.g., received calls, traffic 705, etc.) based on a DRX cycle timer associated with smart phone 210, as indicated by reference number 720. Assume that smart phone 210 previously modified the DRX cycle timer so that smart phone 210 checks EPS 215 for information more frequently. As further shown in FIG. 7B, a coworker of the user may be associated with a tablet computer 210, and may utilize tablet computer 210 to access a PTT application provided in tablet computer 210. Assume that the coworker utilizes the PTT application to generate a request 725 for a PTT session with the user and smart phone 210. Tablet computer 210 may provide request 725 for the PTT session to EPS 215, and EPS 215 may forward request 725 toward smart phone 210 utilizing the QoS framework.

When request 725 is received by smart phone 210, smart phone 210 may execute a PTT application provided in smart phone 210 and may stop displaying email message 715. The PTT application may cause smart phone 210 to display information associated with request 725, such as the coworker's name, the coworker's picture, a mechanism to accept or deny request 725, etc. Assume that the user utilizes the displayed information to accept request 725, and establish a PTT session with tablet computer 210 and the coworker, as indicated by reference number 730 in FIG. 7C. When the PTT session is established, the PTT application may cause smart phone 210 to display a user interface 735 that includes a picture of coworker, a PTT button, and an end call button. As further shown in FIG. 7C, the PTT application of smart phone 210 may utilize frame bundling for PTT traffic associated with the PTT session, as indicated by reference number 740.

Figure 7D:
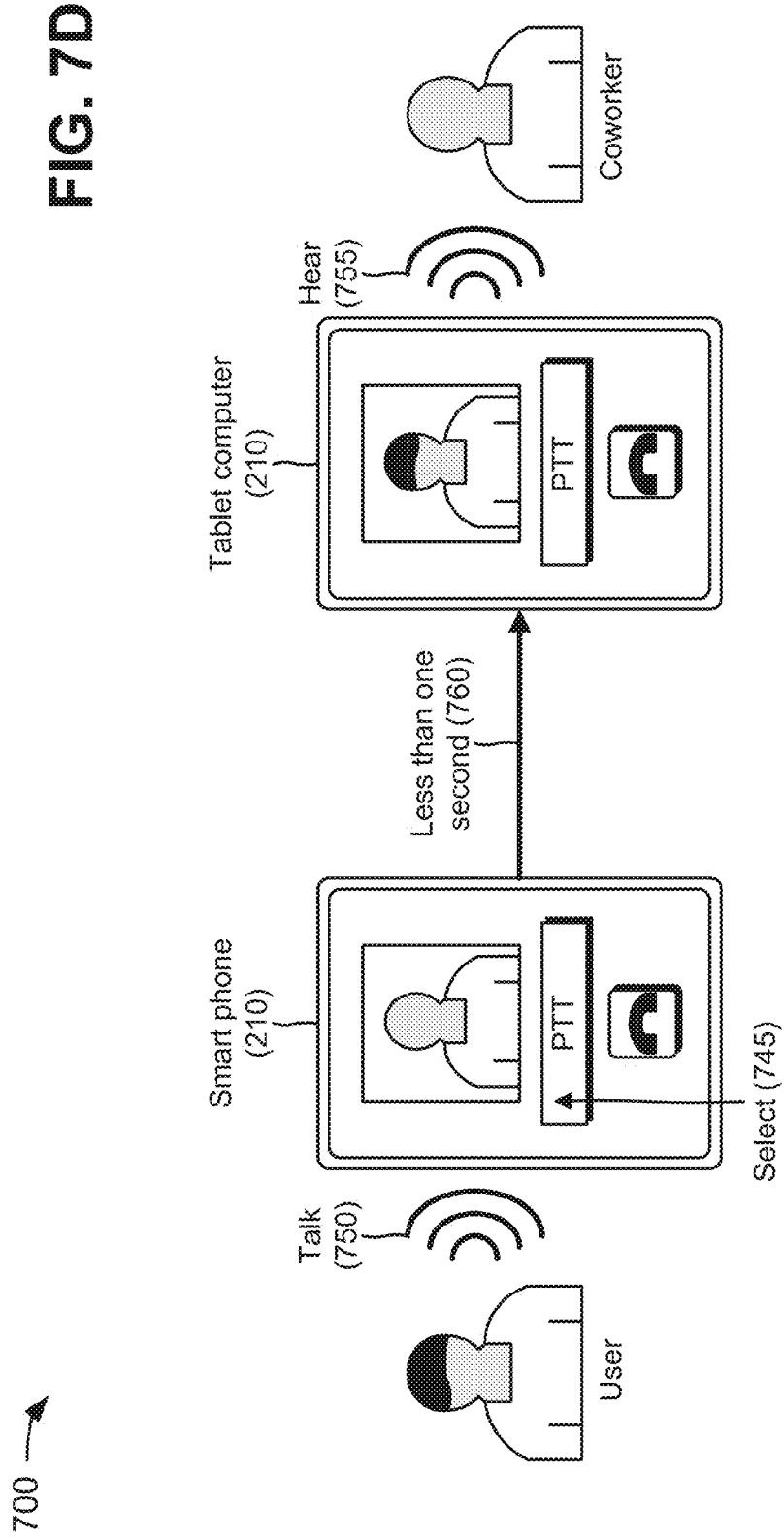
Figure 7F:
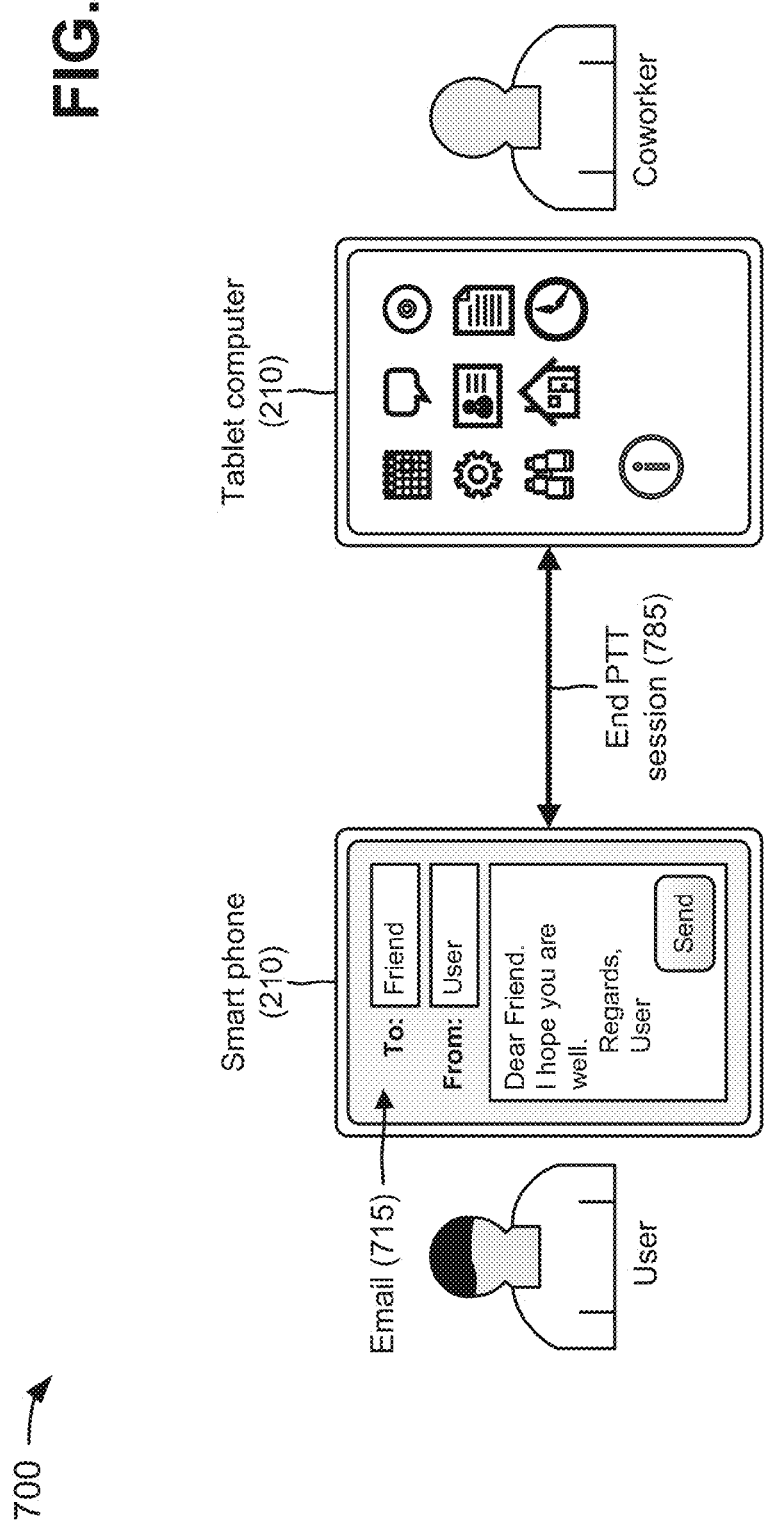

As shown in FIG. 7D, assume that the user selects 745 the PTT button and begins talking to smart phone 210, as indicated by reference number 750. The user's spoken voice may be provided by smart phone 210 to tablet computer 210 (e.g., via EPS 215), and may be output (e.g., as audio) by tablet computer 210 to the coworker, as indicated by reference number 755. As further shown in FIG. 7D, a delay time between when the user speaks and when the coworker hears the user's voice may be approximately less than one second, as indicated by reference number 760.

As shown in FIG. 7E, assume that the coworker selects 765 the PTT button and begins talking to tablet computer 210, as indicated by reference number 770. The coworker's spoken voice may be provided by tablet computer 210 to smart phone 210 (e.g., via EPS 215), and may be output (e.g., as audio) by smart phone 210 to the user, as indicated by reference number 775. As further shown in FIG. 7E, a delay time between when the coworker speaks and when the user hears the coworker's voice may be approximately less than one second, as indicated by reference number 780.

Either the user or the coworker may end the PTT session by selecting the end call button. When the end call button is selected, smart phone 210 and tablet computer 210 may end the PTT session, as indicated by reference number 785 in FIG. 7F. As further shown, after the PTT session ends, smart phone 210 may resume displaying email message 715 to the user, and tablet computer 210 may display a home page or some other information to the coworker.

As indicated above, FIGS. 7A-7F are provided merely as an example. Other examples are possible and may differ from what was described with regard to FIGS. 7A-7F.

Figure 8B:
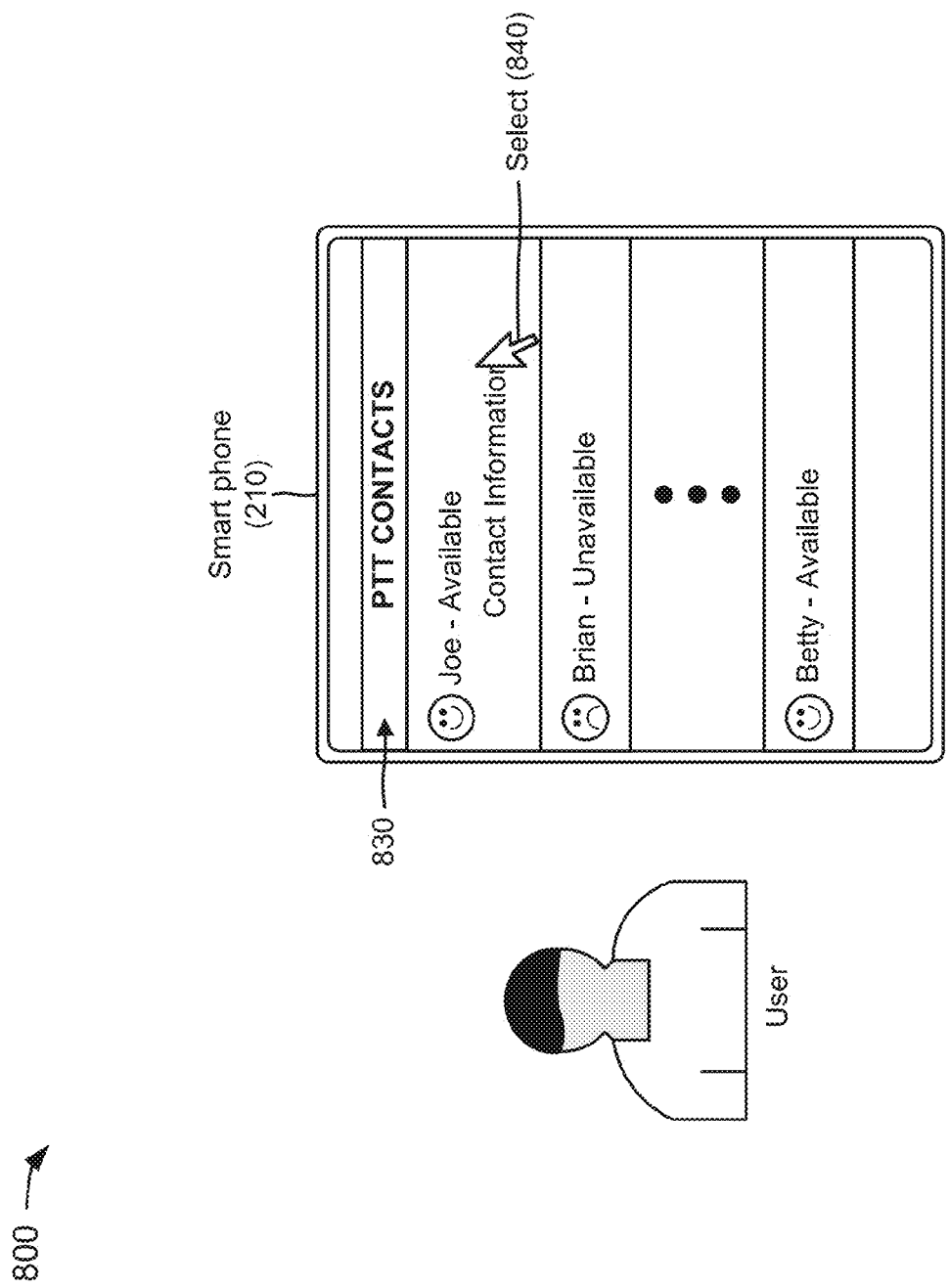

FIGS. 8A-8E are diagrams of another example 800 relating to example process 600 shown in FIG. 6. As shown in FIG. 8A, assume that a user is associated with UE 210 (e.g., a smart phone 210), and that smart phone 210 displays a user interface 810 to the user. User interface 810 may include a home page with icons representing applications provided by smart phone 210. As further shown in FIG. 8A, user interface 810 may include an icon associated with a PTT application provided in smart phone 210. Assume that the user selects the icon associated with the PTT application, as indicated by reference number 820.

When the user selects the icon associated with the PTT application, smart phone 210 may execute the PTT application. The PTT application may cause smart phone 210 to display a user interface 830 associated with the PTT application, as shown in FIG. 8B. User interface 830 may include a list of PTT contacts associated with the user, and a variety of information associated with the PTT contacts. The list of PTT contacts and the information associated with the PTT contacts may be stored locally in smart phone 210 (e.g., in memory 330, FIG. 3) and/or may be stored in a device separate from and accessible by smart phone 210. A first PTT contact (e.g., Joe) may include information about the availability or presence of the first PTT contact (e.g., Joe may be available), and contact information associated with the first PTT contact (e.g., an address, a telephone number, a profile, etc.). A second PTT contact (e.g., Brian) may be unavailable, and a third PTT contact (e.g., Betty) may be available. As further shown in FIG. 8B, assume that the user selects Joe from the list of PTT contacts, as indicated by reference number 840.

When the user selects Joe from the list of PTT contacts, the PTT application may cause smart phone 210 to establish a PTT session with Joe's UE 210. Once the PTT session is established, the PTT application may cause smart phone 210 to display a user interface 850 that includes a picture of Joe, a PTT button, and an end call button, as shown in FIG. 8C. As further shown in FIG. 8C, assume that the user selects 860 the PTT button and begins talking to smart phone 210. The user's spoken voice may be provided by smart phone 210 to Joe's UE 210 (e.g., via EPS 215 and using the QoS framework), and may be output by Joe's UE 210 (e.g., as audio) in approximately less than one second, as indicated by reference number 870.

Figure 8E:
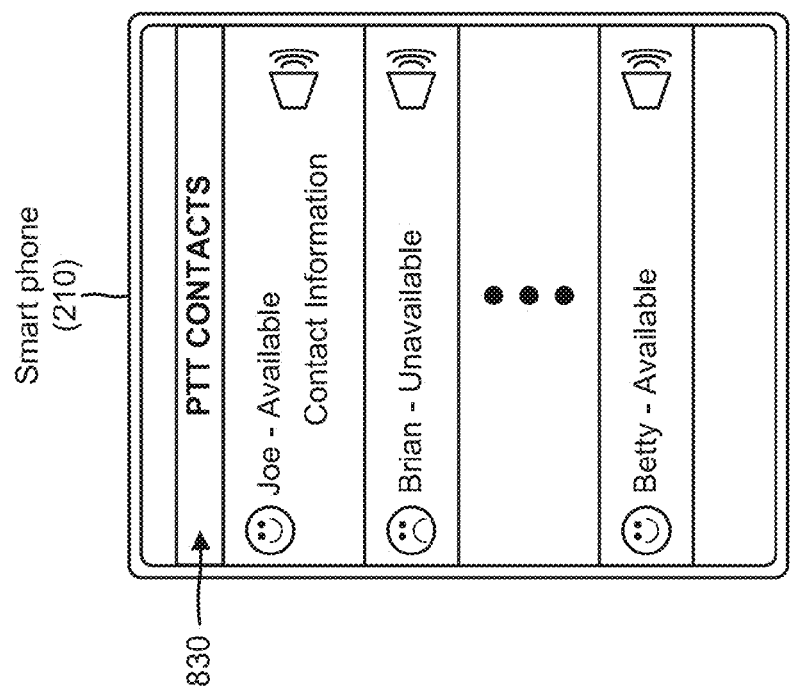

Now assume that Joe selects a PTT button and begins talking to Joe's UE 210. Joe's spoken voice may be provided by Joe's UE 210 to smart phone 210 (e.g., via EPS 215), and may be output by smart phone 210 (e.g., as audio) in approximately less than one second, as indicated by reference number 880 in FIG. 8D. When the user is finished with the PTT session with Joe, assume that the user selects the end call button, as indicated by reference number 890 in FIG. 8D. When the end call button is selected, smart phone 210 may end the PTT session, and may resume displaying user interface 830 (e.g., the list of PTT contacts) to the user, as shown in FIG. 8E, to permit the user to initiate another PTT call.

As indicated above, FIGS. 8A-8E are provided merely as an example. Other examples are possible and may differ from what was described with regard to FIGS. 8A-8E.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Implementations of the security application are described herein with respect to a PTT application and to particular APIs exposed for the purpose of enhancing the PTT application. However, the security application may be utilized to provide secure access to one or more exposed APIs of the UE, other than the particular exposed APIs described herein (e.g., the IMS PDN API and the DRX cycle API). For example, the security application may be utilized to grant or deny the PTT application, and/or one or more other applications of the UE, access to any exposed API of the UE. Furthermore, although the PTT application is described herein in terms of PTT voice calls, the PTT application may alternatively or additionally be utilized for PTT video calls.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    establishing, by a device, a quality of service (QoS) framework with a network connected to the device,
        the device including a push-to-talk (PTT) application, and
        the QoS framework assigning priorities to different types of traffic associated with the device;
    utilizing, by the device, the PTT application to establish a PTT session with another device via the network;
    prioritizing, by the device and based on the QoS framework, PTT traffic, provided in the PTT session, over best effort traffic during the PTT session with the other device;

performing, by the device, frame bundling of the PTT traffic, provided in the PTT session with the other device, to reduce overhead on the network;
determining, by the device, the network to which the device is connected; and
selectively enabling or disabling the PTT application, by the device, based on whether the network includes a long term evolution (LTE) access network or a wireless local area network.

2. The method of claim 1, further comprising:
modifying a timer that dictates when the device checks for traffic received from the network,
the timer being utilized to establish the PTT session.

3. The method of claim 2, where modifying the timer comprises:
determining whether the PTT application is authenticated to access an application programming interface (API) that sets the timer;
preventing the PTT application from accessing the API when the PTT application is not authenticated;
accessing the API via the PTT application and when the PTT application is authenticated; and
utilizing the API to modify the timer.

4. The method of claim 2, further comprising:
restoring the timer to a default value when the PTT application is removed from the device or when the device is not connected to the long term evolution (LTE) access network.

5. The method of claim 1, further comprising:
disabling the PTT application when the device is roaming.

6. The method of claim 1, where, when the network includes an Internet protocol (IP) multimedia subsystem (IMS) network and a packet data network (PDN), the method further comprises:
accessing an application programming interface (API) via the PTT application; and
utilizing the API to establish data routes with the IMS network and the PDN.

7. The method of claim 6, further comprising:
determining whether the PTT application is authenticated to access the API;
preventing the PTT application from accessing the API when the PTT application is not authenticated; and
permitting the PTT application to access the API when the PTT application is authenticated.

8. A device, comprising:
a memory to store a push-to-talk (PTT) application; and
one or more processors to:
determine a quality of service (QoS) framework for a network connected to the device,
the QoS framework assigning priorities to different types of traffic associated with the device,
utilize the PTT application to establish a PTT session with another device via the network,
prioritize, based on the QoS framework, PTT traffic, provided in the PTT session, over best effort traffic during the PTT session with the other device,
bundle one or more PTT packets, of the PTT traffic provided in the PTT session, into one or more frames, to reduce overhead on the network,
determine the network to which the device is connected, and
selectively enable or disable the PTT application based on whether the network includes a long term evolution (LTE) access network or a wireless local area network.

9. The device of claim 8, where the one or more processors are further to:
decrease a timer associated with the device from a first value to a second value,
the timer dictating when the device checks for traffic received from the network,
the second value of the timer causing the device to more frequently check for traffic received from the network than the first value of the timer, and
the timer being utilized to establish the PTT session.

10. The device of claim 9, where, when decreasing the timer, the one or more processors are to:
determine whether the PTT application is authenticated to access an application programming interface (API) that sets the timer,
prevent the PTT application from accessing the API when the PTT application is not authenticated,
access the API via the PTT application and when the PTT application is authenticated, and
utilize the API to decrease the timer.

11. The device of claim 9, where the one or more processors are further to:
restore the timer to the first value when the PTT application is removed from the device or when the device is not connected to the long term evolution (LTE) access network,
the first value causing the device to less frequently check for traffic received from the network than the second value.

12. The device of claim 8, where the one or more processors are further to:
disable the PTT application when the device is roaming.

13. The device of claim 8, where, when the network includes an Internet protocol (IP) multimedia subsystem (IMS) network and a packet data network (PDN), the one or more processors are further to:
access an application programming interface (API) via the PTT application, and
utilize the API to establish data routes with the IMS network and the PDN.

14. The device of claim 13, where the one or more processors are further to:
remove the data routes established with the IMS network and the PDN when the PTT application is removed from the device.

15. A non-transitory computer-readable medium for storing instructions, the instructions comprising:
one or more instructions that, when executed by one or more processors of a device, cause the one or more processors to:
establish a quality of service (QoS) framework with a network connected to the device,
the device including a push-to-talk (PTT) application, and
the QoS framework assigning priorities to different types of traffic associated with the device,
utilize the PTT application to establish a PTT session with another device via the network,
prioritize, based on the QoS framework, PTT traffic, provided in the PTT session, over best effort traffic during the PTT session with the other device,
perform frame bundling of the PTT traffic, provided in the PTT session with the other device, to reduce overhead on the network,
determine the network to which the device is connected, and selectively enable or disable the PTT application based on whether the network includes a long term evolution (LTE) access network or a wireless local area network.

16. The computer-readable medium of claim 15, where the instructions further comprise:
one or more instructions that, when executed by the one or more processors, cause the one or more processors to:
access, via the PTT application, an application programming interface (API) that sets a timer,
the timer dictating when the device checks for traffic received from the network, and
the timer being utilized to establish the PTT session, and
utilize the API to modify the timer.

17. The computer-readable medium of claim 16, where the instructions further comprise:
one or more instructions that, when executed by the one or more processors, cause the one or more processors to:
restore the timer to a default value when the PTT application is removed from the device or when the device is not connected to the long term evolution (LTE) access network.

18. The computer-readable medium of claim 15, where the instructions further comprise:
one or more instructions that, when executed by the one or more processors, cause the one or more processors to:
disable the PTT application when the device is roaming.

19. The computer-readable medium of claim 15, where, when the network includes an Internet protocol (IP) multimedia subsystem (IMS) network and a packet data network (PDN), the instructions further comprise:
one or more instructions that, when executed by the one or more processors, cause the one or more processors to:
execute, continuously, a voice application associated with the PTT application,
access an application programming interface (API) via the PTT application, and
utilize the API to establish data routes with the IMS network and the PDN.

20. The computer-readable medium of claim 19, where the instructions further comprise:
one or more instructions that, when executed by the one or more processors, cause the one or more processors to:
determine whether the PTT application is authenticated to access the API,
prevent the PTT application from accessing the API when the PTT application is not authenticated, and
permit the PTT application to access the API when the PTT application is authenticated.

* * * * *